United States Patent [19]
Schott et al.

[11] Patent Number: 5,827,979
[45] Date of Patent: Oct. 27, 1998

[54] SIGNAL PROCESSING APPARATI AND METHODS FOR ATTENUATING SHIFTS IN ZERO INTERCEPT ATTRIBUTABLE TO A CHANGING BOUNDARY CONDITION IN A CORIOLIS MASS FLOW METER

[75] Inventors: Michael N. Schott, Loveland; Donald R. Cage, Longmont; Larry K. Carmichael, Westminster; David T. Hahn, Longmont, all of Colo.

[73] Assignee: Direct Measurement Corporation, Longmont, Colo.

[21] Appl. No.: 636,034

[22] Filed: Apr. 22, 1996

[51] Int. Cl.$^6$ .................................................. G01F 1/84
[52] U.S. Cl. ............................. 73/861.357; 73/861.356
[58] Field of Search ....................... 73/861.356, 861.357, 73/861.355

[56] References Cited

U.S. PATENT DOCUMENTS

| | | | |
|---|---|---|---|
| Re. 31,450 | 11/1983 | Smith | 73/861.38 |
| 3,444,723 | 5/1969 | Wakefield | 73/32 |
| 3,485,098 | 12/1969 | Sipin | 73/194 |
| 3,874,221 | 4/1975 | Lockie | 73/30 |
| 3,927,565 | 12/1975 | Pavlin et al. | 73/194 |
| 4,009,616 | 3/1977 | Wonn | 73/398 R |
| 4,109,524 | 8/1978 | Smith | 73/194 |
| 4,217,774 | 8/1980 | Agar | 73/32 |
| 4,420,983 | 12/1983 | Langdon | 73/861.18 |

(List continued on next page.)

FOREIGN PATENT DOCUMENTS

| | | |
|---|---|---|
| 0 109 218 | 5/1984 | European Pat. Off. . |
| 0 119 638 | 9/1984 | European Pat. Off. . |
| 0 210 308 | 2/1987 | European Pat. Off. . |
| WO 87/06691 | 11/1987 | European Pat. Off. . |
| 0 261 435 | 3/1988 | European Pat. Off. . |
| 0 272 758 | 6/1988 | European Pat. Off. . |
| 0 316 908 | 5/1989 | European Pat. Off. . |
| 0 375 300 | 6/1990 | European Pat. Off. . |
| 0 701 107 A2 | 3/1996 | European Pat. Off. ......... G01F 1/00 |
| 2 598 801 | 11/1987 | France . |
| 35 05 166 C2 | 8/1987 | Germany . |
| 88 14 606 U | 9/1989 | Germany . |
| 57-137818 | 8/1982 | Japan . |
| 58-20926 | 7/1983 | Japan . |
| 62-180741 | 8/1987 | Japan . |
| 1008-617-A | 2/1980 | U.S.S.R. . |
| 2 171 200 | 8/1986 | United Kingdom . |
| WO 85/05677 | 12/1985 | WIPO . |

OTHER PUBLICATIONS

Publication entitled "Direkte Massedurchflussmessung, Insbesonderemit Coriolisverfahren by Von W. Steffen und Dr. W. Stumm; Part II; pp. 301–305; Published in Messen Prüfen Automatisieren" vol. 23 (1987) May, No. 5, pp. 301–305; Bad Wörishofen, W. Germany.

*Primary Examiner*—George M. Dombroske
*Assistant Examiner*—Harshad Patel
*Attorney, Agent, or Firm*—Hitt Chwang & Gaines, P.C.

[57] ABSTRACT

In the field of Coriolis mass flow meters, determination of the true zero of the meter has always been problematic due to zero drift effects with changing boundary conditions and fluid parameters. Disclosed are apparatus and methods for determining the true mass flow related component of the signal of the meter separately from errors caused by changing boundary conditions and fluid parameters. Accordingly, an apparatus for measuring a mass flow rate of a fluid flowing relative to a flow conduit includes: (1) a force driver for vibrating the flow conduit, (2) a sensor for measuring a resulting motion of the flow conduit and producing a sensed motion signal indicative thereof, the resulting motion containing a Coriolis mode component and a boundary condition mode component, (3) signal processing circuitry, coupled to the sensor to receive the sensed motion signal therefrom, for determining a magnitude of the Coriolis mode component of the resulting motion and (4) output circuitry for producing an output signal proportional to the mass flow rate, the output signal substantially free of influence from the boundary condition mode component of the sensed motion signal.

36 Claims, 9 Drawing Sheets

U.S. PATENT DOCUMENTS

| | | | |
|---|---|---|---|
| 4,422,338 | 12/1983 | Smith | 73/861.38 |
| 4,490,009 | 12/1984 | Nakai et al. | 350/96.23 |
| 4,491,025 | 1/1985 | Smith et al. | 73/861.38 |
| 4,574,639 | 3/1986 | Ward | 73/702 |
| 4,622,858 | 11/1986 | Mizerak | 73/861.38 |
| 4,628,744 | 12/1986 | Lew | 73/861.38 |
| 4,653,332 | 3/1987 | Simonsen | 73/861.38 |
| 4,680,974 | 7/1987 | Simonsen et al. | 73/861.38 |
| 4,691,578 | 9/1987 | Herzl | 73/861.38 |
| 4,711,132 | 12/1987 | Dahlin | 73/861.38 |
| 4,716,771 | 1/1988 | Kane | 73/861.38 |
| 4,729,243 | 3/1988 | Friedland et al. | 73/861.38 |
| 4,733,569 | 3/1988 | Kelsey et al. | 73/861.38 |
| 4,756,197 | 7/1988 | Herzl | 73/861.38 |
| 4,768,384 | 9/1988 | Flecken et al. | 73/861.02 |
| 4,776,220 | 10/1988 | Lew | 73/861.38 |
| 4,793,191 | 12/1988 | Flecken et al. | 73/861.38 |
| 4,798,091 | 1/1989 | Lew | 73/861.38 |
| 4,803,867 | 2/1989 | Dahlin | 73/32 |
| 4,811,606 | 3/1989 | Hasegawa et al. | 73/861.38 |
| 4,813,289 | 3/1989 | Lew | 73/861.38 |
| 4,823,614 | 4/1989 | Lew | 73/861.38 |
| 4,829,832 | 5/1989 | Lew | 73/861.38 |
| 4,831,885 | 5/1989 | Dahlin | 73/861.38 |
| 4,852,410 | 8/1989 | Corwon et al. | 73/861.38 |
| 4,856,346 | 8/1989 | Kane | 73/861.38 |
| 4,869,097 | 9/1989 | Tittmann et al. | 73/52 |
| 4,879,910 | 11/1989 | Lew | 73/861.37 |
| 4,882,935 | 11/1989 | Lew | 73/861.38 |
| 4,891,991 | 1/1990 | Mattar et al. | 73/861.38 |
| 4,934,195 | 6/1990 | Hussain | 73/861.38 |
| 4,934,196 | 6/1990 | Romano | 73/861.356 |
| 4,949,583 | 8/1990 | Lang et al. | 73/861.37 |
| 4,955,239 | 9/1990 | Cage et al. | 73/861.355 |
| 5,024,104 | 6/1991 | Dames | 73/861.37 |
| 5,027,662 | 7/1991 | Titlow et al. | 73/861.356 |
| 5,040,415 | 8/1991 | Barkhoudarian | 73/198 |
| 5,044,207 | 9/1991 | Atkinson et al. | 73/861.37 |
| 5,069,075 | 12/1991 | Hansen et al. | 73/861.38 |
| 5,226,330 | 7/1993 | Lew | 73/861.37 |
| 5,230,254 | 7/1993 | Craft | 73/861.38 |
| 5,373,745 | 12/1994 | Cage | 73/861.37 |
| 5,381,697 | 1/1995 | Van Der Pol | 73/861.356 |
| 5,473,949 | 12/1995 | Cage et al. | 73/861.356 |
| 5,497,665 | 3/1996 | Cage et al. | 73/861.356 |

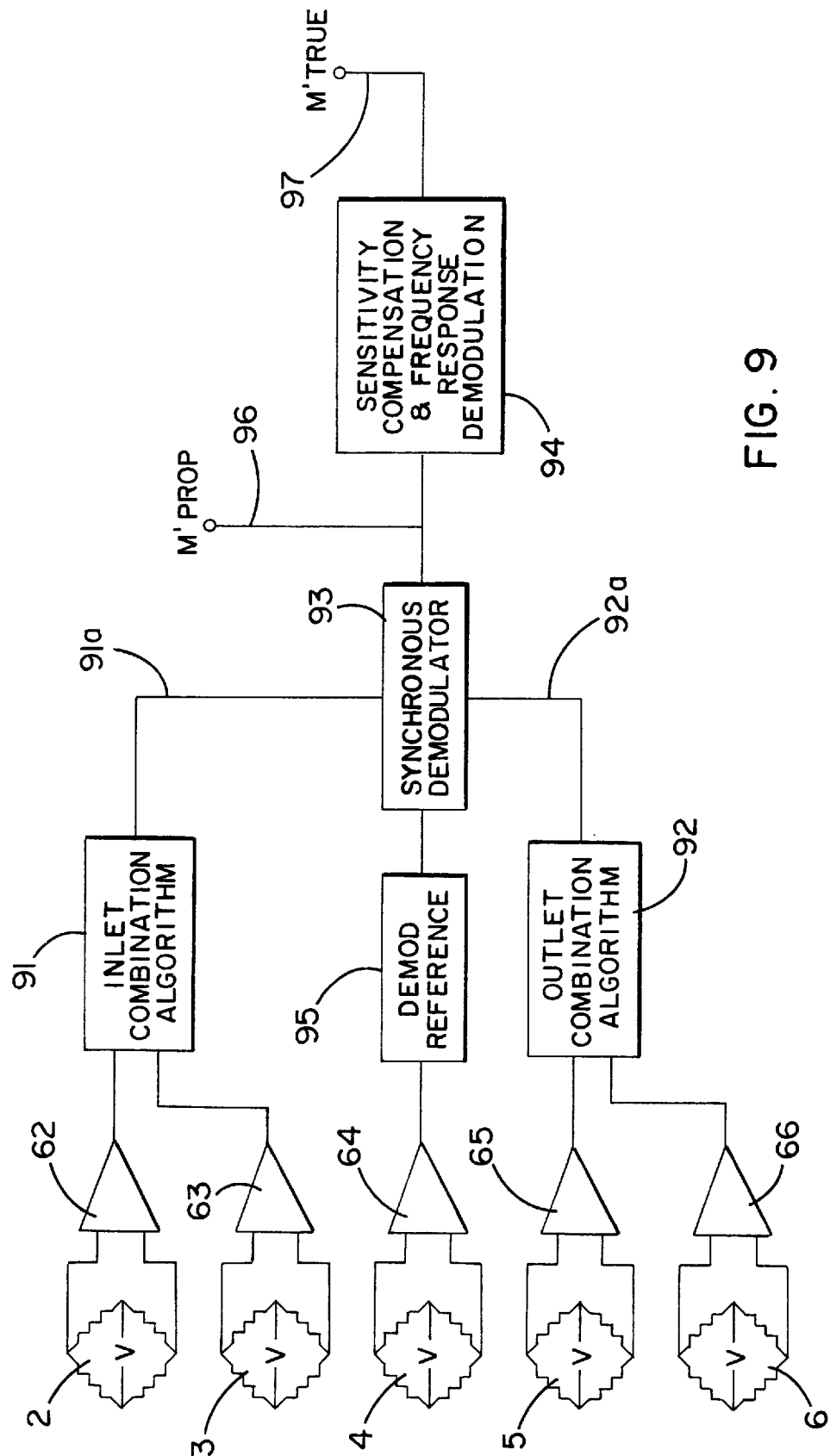

SIGNAL PROCESSING APPARATI AND METHODS FOR ATTENUATING SHIFTS IN ZERO INTERCEPT ATTRIBUTABLE TO A CHANGING BOUNDARY CONDITION IN A CORIOLIS MASS FLOW METER

TECHNICAL FIELD OF THE INVENTION

The present invention is directed, in general, to Coriolis mass flow meters and, more specifically, to signal processing apparatus and methods for attenuating shifts in zero intercept attributable to a changing boundary condition in a Coriolis mass flow meter.

BACKGROUND OF THE INVENTION

In the field of flow measurement, flow meters employing the Coriolis principle have recently become of primary interest in industry due to their ability to measure mass flow rate of fluid without an intrusive device in the flow stream. As with any measurement device, the output of the device is normally made to have a linear relationship with the parameter being measured (e.g., mass flow rate).

In general, a Coriolis flow meter is a device that employs a flow conduit that is caused to vibrate in a "driven mode" of vibration. This vibration, in conjunction with the flowing fluid, periodically alters the direction of the flowing fluid, thereby causing periodic Coriolis forces to bear on the flow conduit. These Coriolis forces, in turn, cause a response of the flow conduit (a "Coriolis mode" of vibration) to occur that is superimposed on the driven mode. These effects include amplitude or phase changes in the motion at a given location on the flow conduit. The amplitude of the Coriolis mode is normally assumed to be proportional to the mass flow rate of the fluid, augmented by the sensitivity of the device at that moment.

Traditional techniques for extracting the mass flow rate related information from the combined motion of both the driven mode and the Coriolis mode include measuring a time delay between two points on the flow conduit, subtracting motions sensed at two points along the flow conduit, measuring a phase difference between two points on the flow conduit or measuring a motion at a point where no driven motion should exist, only Coriolis mode motion. All of these methods herein described and others not described generally employ one or more physical sensors cooperating to make a single measurement (e.g., phase, time or velocity) that should be proportionally related to mass flow rate, augmented by the sensitivity of the meter at that moment.

With an output signal that is linear with mass flow rate, two parameters need to be known for the linear relationship to be useful to the end users, namely: "sensitivity" and "zero" (as hereinafter explicitly defined).

With regard to the sensitivity, the magnitude of the Coriolis mode is greatly affected by changes in fluid and flow conduit parameters such as fluid density, temperature, pressure, viscosity, conduit stress and frequency. In addition, each of these parameters affect the sensitivity to different degrees, depending on the type of measurement and signal processing used. For example, time delay measurements, phase measurements and velocity measurements of the Coriolis mode, are all affected differently by the aforementioned fluid and ambient parameters.

The evolution of the Coriolis mass flow meter has seen numerous refinements and improvements in the determination of the sensitivity of the device, owing primarily to the fact that sensitivity changes in the device are a predictable result of the design of the device in combination with the measurable parameters that can change that sensitivity, such as fluid temperature, pressure, density, viscosity or conduit stress. Therefore, methods for determining sensitivity have mainly concentrated on the determination of these parameters and compensation for their individual and combined effects.

Unfortunately, the determination of the zero of a Coriolis mass flow meter has not enjoyed the same progressive evolution as has the sensitivity as explained above. This is primarily because the zero of a meter and its propensity to change has been assumed to be an artifact of the mechanical design and manufacture of a given device owing primarily to the accuracy of the "balance" of the device. Thus, while sensitivity determination and compensation are important with regard to Coriolis flow meter signal processing, the determination of the mass flow related signal as separated from zero shifts due to boundary condition effects remains a significant problem.

Traditionally, the flow conduit has normally been assumed to be an isolated system wherein both the driven mode and the Coriolis mode of vibration can occur without disturbance from changes in the boundary conditions. This is, of course, not the case in actual applications. Designs of Coriolis meters have traditionally attempted to balance the vibration of the flow conduit to attempt to achieve this isolated condition. These design goals have led to the twin conduit "parallel path" type flow meter in which one conduit's vibration is counter balanced by the other. Since changes in the fluid parameters are seen by both conduits equally, balance is theoretically maintained. In addition, these design goals have led to the development of the radially-vibrating flow conduit in which a single conduit is employed and that may be vibrated in a radial mode in which one side of the conduit is vibrated in opposition to the other side of the same conduit, thereby maintaining balance.

While these balanced designs have achieved some commercial success, this "balancing" approach is problematic in two ways. First, nothing is perfect; therefore, even the most perfectly balanced theoretical design, when made into an actual flow meter, falls short of perfection and experiences zero drift problems due to boundary condition effects. Secondly, by having to create a balanced design, the flow meter designer is limited to certain geometries that can attempt to achieve this goal. This approach eliminates the possibility of using "unbalanced" designs that may, in fact, be more desirable from an end user's standpoint (such as the single straight flow conduit operating in a bending mode of vibration).

Prior art reveals some attempts have been made to deal with the problems associated with an unbalanced single straight conduit design. One method is described in U.S. Pat. No. 5,323,658 to Yao, et al. Yao, et al. describe a method that attempts to "dynamically stabilize" the vibration by measuring and dynamically canceling the vibration of the "fixation portion of the measuring pipe." This method attempts to deal with unbalanced vibrations by supplying forces from a dynamic forcer. Unfortunately, Yao, et al. relies on a total correlation between the vibrations and the counterbalancing forces delivered by the dynamic forcer. In the real world, the correlation may not be complete, resulting in the conduit's receipt of forces not only from the original vibrations, but also from the dynamic forcer, perhaps doubling the unbalanced forces on the conduit.

The fundamental problem with unbalanced single straight conduit designs is that boundary condition changes, in combination with the driven mode of vibration can change the amplitude or phase relationship, or both, of the motion at a given location along the flow conduit. This changed relationship may be interpreted (by traditional signal processing techniques) as a mass flow effect thereby erroneously shifting the zero.

To date, Coriolis sensors and signal processing circuits have been unable to distinguish the difference between (a) mass flow rate related effects and (b) a shifted zero due to boundary condition-related effects (hereinafter defined), and therefore have been limited in their accuracy to the "zero stability" value of the device. This zero stability value is normally a limit that is experimentally determined, and plainly stated on most manufacturers specifications. In addition, this limitation has prevented the use of "unbalanced" meter designs. Consequently the only meter designs that are currently known for high accuracy results are balanced designs such as parallel path type twin conduit designs, or radially vibrating single conduit designs.

This limitation has largely prevented the use of a single straight conduit vibrating in a bending mode without the benefit of a counterbalancing flow conduit to achieve good overall balance. This single conduit bending mode configuration is highly desirable to end users due to, for instance, its simplicity, ease of inspection or low pressure drop. However, without the benefit of a counterbalancing second flow conduit, the configuration cannot be successfully balanced for all conditions (such as fluid temperature, pressure, density, viscosity or conduit stress) and therefore is subject to zero shifts with traditional signal processing techniques. What is needed is the ability to determine mass flow rate related signals separately from the effects of zero shifts due to changing boundary conditions, on a Coriolis mass flow meter.

Accordingly, what is needed in the art is a way to distinguish between mass flow rate effects and shifting zero effects on a Coriolis mass flow meter.

SUMMARY OF THE INVENTION

To address the above-discussed deficiencies of the prior art, it is a primary object of the present invention to provide apparatus and methods for separately determining both mass flow effects and shifted zero effects, thereby allowing the ultimate accuracy of a given Coriolis mass flow meter to be improved by reducing the zero stability limitation. This ability also allows for the use of unbalanced Coriolis mass flow meter configurations that is normally subject to unacceptably large zero shift problems.

Again, with an output signal that is linear with mass flow rate, two parameters need to be known for the linear relationship to be useful to the end users, namely: "sensitivity" and "zero." Sensitivity effects and the compensation thereof are thoroughly disclosed in U.S. Pat. No. 5,497,665, issued to Cage, et al. and in U.S. patent application Ser. No. 08/569,967 by Cage, et al. The preferred method of sensitivity determination and compensation for the herein preferred embodiment is that disclosed in U.S. patent application Ser. No. 08/569,967 by Cage, et al. wherein the flow conduit is excited using a reference excitation. The response of the flow conduit to that reference excitation is then used to determine and compensate for sensitivity changes.

The present invention distinguishes itself from Yao, et al. (described above) and any such prior art methods by specifically measuring a plurality of locations on the active portion of the flow conduit, and through the understanding of the shape of the flow conduit motion that results from Coriolis forces as opposed to the shape of the flow conduit motion that results from poor or changing boundary conditions, the present invention mathematically distinguishes between the two types of information and thereby solves for the mass flow related component, substantially devoid of errors due to changing boundary conditions. The present invention is therefore not concerned with any noise or vibration that takes place beyond the active portion of the flow conduit, and neither attempts to measure or compensate for any such noise or vibration.

As stated above, the fundamental problem with unbalanced single straight conduit designs is that boundary condition changes, in combination with the driven mode of vibration can change the amplitude or phase relationship, or both, of the motion at a given location along the flow conduit, that can be interpreted (by traditional signal processing techniques) as a mass flow effect, thereby erroneously shifting the zero.

The present invention addresses this problem by distinguishing between Coriolis effects and boundary condition effects. This is understandable from the fact that Coriolis effects on the flow conduit, and boundary condition effects on the flow conduit are fundamentally different with regard to the amplitude and/or phase of their respective responses. Specifically, Coriolis effects derive from a smoothly varying distributed force profile all along the length of the flow conduit, whereas boundary condition effects derive from moment and shear forces acting on the ends of the flow conduit. These two different "excitation sources" therefore cause two distinctly different responses on the flow conduit and although they can be similar, they are different enough to allow the present invention to discern between the two.

By specifically sensing the motion along the active portion of the flow conduit at a plurality of points that contain different amounts of these two types of information, the resulting signals can be processed so as to solve for the values of one or both components and thereby substantially separate and eliminate the boundary condition effects from the mass flow effects. The end result is a final output signal that is substantially independent of zero shift problems due to changes in boundary conditions. This achievement therefore allows for the use of unbalanced designs such as a single conduit bending mode type meter, that is normally subject to unacceptably large zero shift problems. However, using the present invention, these zero problems are substantially eliminated.

In general, the Coriolis mode resulting from mass flow effects, produces a predictable and symmetrical amplitude, strain and phase distribution along the flow conduit as will be explained in detail hereinafter. A boundary condition mode resulting from the driven vibration in combination with boundary condition effects in general produces a discernibly different and often asymmetrical amplitude, strain and phase distribution along the flow conduit. It is this difference between Coriolis effects and boundary condition effects that allows for the determination of the magnitude of the mass flow related component separate from the errors caused by boundary condition effects.

Therefore, by acquiring at least two motion signals from the flow conduit having different relative amounts of Coriolis effect versus boundary condition effect, the motion information can be analyzed by a variety of methods (hereinafter described) to separate the magnitude of the mass flow related effects from that of the boundary condition related effects. Higher accuracy is achieved by having more measurements along the flow conduit, and since boundary condition effects can enter from either or both ends of the flow conduit, still higher accuracies can be achieved by separately analyzing the inlet and outlet halves of the flow conduit with respect to the center. In effect, the shape of the actual motion is determined, and the shape of the Coriolis mode component is determined separately from the shape of the boundary condition mode component.

In the attainment of the above primary object, the present invention provides an apparatus for measuring a mass flow rate of a fluid flowing relative to a flow conduit, including: (1) a force driver for vibrating the flow conduit, (2) a sensor for measuring a resulting motion of the flow conduit and producing a sensed motion signal indicative thereof, the resulting motion containing a Coriolis mode component and a boundary condition mode component, (3) signal processing circuitry, coupled to the sensor to receive the sensed motion signal therefrom, for determining a magnitude of the Coriolis mode component of the resulting motion and (4) output circuitry for producing an output signal proportional to the mass flow rate, the output signal substantially free of influence from the boundary condition mode component of the sensed motion signal.

Several physical embodiments and related signal processing methods are hereinafter described to achieve the stated goal. The physical embodiments described include: (a) a flow conduit with five measurement locations along the length of the flow conduit and (b) a flow conduit with two measurement locations along the length of the flow conduit, the preferred embodiment having five measurement locations.

The primary signal processing method described involves curve fitting the measured motion and extracting the Coriolis related component therefrom, separate from the boundary condition error signal component.

In general the physical embodiments herein described involve multiple motion sensing points along the length of the flow conduit in order to accurately describe the motion (e.g., the shape of the amplitude, phase, strain or velocity) distribution along the length of the flow conduit. Therefore, the more sensing points along the flow conduit length, the more accurate this distribution information are. Once the motion signals are acquired, they are preferably processed by mathematical methods that seek to separate the anticipated motion distribution pertaining to the Coriolis mode, from any errors due to other effects such as boundary condition effects. These mathematical methods include simultaneous solutions of nonlinear equations, curve fitting methods, or specific algorithms applied to the data.

The preferred method of processing the acquired motion signals is to curve-fit the acquired data points using a function involving the three types of information that are principally present in the data, namely: (a) the driven mode information, (b) the Coriolis effect information, and (c) the boundary effect information. The measured function therefore takes the form of the following generalized Equation (1):

$$F(x,t) = Dm(x,t) + Cm(x,t) + BCm(x,t) \qquad (1)$$

where:

F(x,t) is the amplitude of the measured motion at position (x) at time (t). (the term motion herein can mean any type of measured quantity, such as displacement, velocity, strain, phase or acceleration.);

Dm(x,t) is the amplitude of the motion at position (x) at time (t) due to the Driven Mode of vibration ("Dm");

Cm(x,t) is the amplitude of the motion at position (x) at time (t) due to the Coriolis Mode of vibration ("Cm"); and BCm(x,t) is the amplitude of the motion at position (x) at time (t) due to the Boundary Condition Mode of vibration ("BCm").

The functions Dm(x,t), Cm(x,t) and BCm(x,t) should be determined by the designer using finite element analysis ("FEA") techniques during the design of the flow conduit. The actual functions can also be determined for the structure by analysis after the structure is manufactured or during a calibration procedure as hereinafter described. Actual measurement of these functions for each structure can improve the accuracy of the results but may prove more costly on a production basis. This represents a tradeoff between production costs and ultimate accuracy.

In the preferred embodiment, these functions are determined using FEA techniques and modified during a calibration procedure, and their mathematical representations are stored in the signal processing electronics. The motion at each sensing point is measured and at a specified time (t) usually once per conduit vibration cycle, the amplitudes of these motions are determined and applied to a curve fitting routine. The preferred curve-fitting routine is the Gauss-Newton method whereby the anticipated shape of each motion component (Dm, Cm, and BCm functions) are characterized using polynomials and these polynomials along with their first and second derivatives are stored in the electronics and used by a solver that determines the "best fit" of the measured data to the polynomials.

The curve-fitting routine then solves for the components of each term of Equation (1), thereby separating out the individual components of Dm, Cm and BCm. Once solved, the coefficient relating to Cm is then proportional to the mass flow rate through the meter at that moment and substantially devoid of zero shift errors due to boundary condition effects. A mass flow rate signal is then created proportional to Cm, that then may need to be further compensated for the sensitivity of the flow conduit at that moment.

As previously mentioned, many types of algorithms can be applied for sensitivity compensations such as temperature corrections for the elastic modulus of the flow conduit. Another sensitivity compensation method involves dividing the proportional mass flow rate signal by $W^n$ where W is the driven mode frequency, and "n" is a number or integer determined by the designer. This method is fully set forth in U.S. Pat. No. 5,497,665, issued to Cage, et al. Other commonly applied sensitivity corrections include pressure, density, viscosity, frequency and conduit stress. Because of the number and complexity of these individual sensitivity corrections, the preferred embodiment uses the method described in U.S. patent application Ser. No. 08/569,967 by Cage, et al., wherein a reference excitation is applied to the flow conduit and its frequency response to that excitation is measured. This response then represents the sensitivity of the flow conduit at that moment, regardless of the multifarious combinations of effects that may be acting on the flow conduit causing changes in that sensitivity.

The mass flow rate signal is then compensated (if necessary) for the sensitivity of the flow conduit and the resultant signal is then truly representative of mass flow rate and substantially devoid of errors due to boundary conditions (and changes therein), and devoid of errors due to sensitivity changes in the flow conduit as well.

In addition to the preferred embodiment using five sensing locations along the flow conduit and processing the motion information using curve-fitting techniques, an embodiment using two sensing locations along the flow conduit and other signal processing techniques is also described. Many other embodiments and signal processing methods are anticipated that fall within the scope of the present invention such that at least two measurements are made along the length of the flow conduit having different amounts of Coriolis mode versus boundary condition mode information, and the measurement information is then processed in such a way as to separate these two parameters. The Coriolis mode information is then isolated from errors due to changing boundary conditions and a mass flow related signal is created therefrom. This signal is then modified as necessary for any changes in the sensitivity of the flow conduit and the result is a true mass flow related signal substantially devoid of errors due to boundary condition changes.

In a preferred embodiment of the present invention, the flow conduit is selected from the group consisting of: (1) a conduit within which the fluid flows, (2) a conduit without which the fluid flows, (3) an arbitrary surface over which the fluid flows and (4) a single straight conduit.

In a preferred embodiment of the present invention, the force driver vibrates the flow conduit in a mode selected from the group consisting of: (1) a bending mode of vibration and (2) a radial mode of vibration.

In a preferred embodiment of the present invention, the sensor is selected from the group consisting of: (1) a strain gage, (2) a magnet/coil pair, (3) an accelerometer and (4) a plurality of motion sensors located along a length of the flow conduit.

In a preferred embodiment of the present invention, the signal processing circuitry determines the magnitude of the Coriolis mode component by a method selected from the group consisting of: (1) curve fitting a measured shape of the resulting motion, (2) solving simultaneous equations relating to a measured shape of the resulting motion, (3) employing the resulting motion at a center of the flow conduit as a reference, (4) employing an implied motion at a center of the flow conduit as a reference, (5) employing information describing the Coriolis mode component, (6) employing information describing the boundary condition mode component, (7) employing information describing a drive mode component of the resulting motion, (8) finding a best fit solution for the Coriolis mode component, (9) applying a function of "R" to the Coriolis mode component and (10) solving for both the Coriolis mode component and the boundary condition mode component.

In a preferred embodiment of the present invention, the apparatus further comprises sensitivity compensation circuitry for adjusting the output signal to compensate for a sensitivity of the apparatus to the mass flow rate of the fluid. In a more preferred embodiment, the sensitivity compensation circuitry comprising means for compensating an M'prop signal by a function of one selected from the group consisting of: (1) temperature, (2) pressure, (3) density, (4) flow conduit stress, (5) viscosity, (6) $W^n$ and (7) frequency response.

In a preferred embodiment of the present invention, the signal processing circuitry manipulates calibratable coefficients.

In a preferred embodiment of the present invention, the signal processing circuitry contains sensitivity compensation circuitry, the sensitivity compensation circuitry capable of compensating for one selected from the group consisting of: (1) temperature, (2) pressure, (3) density, (4) flow conduit stress, (5) viscosity, (6) $W^n$ and (7) frequency response.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 illustrates a diagram of signal processing circuitry employable in conjunction with an alternate to the preferred embodiment.

DETAILED DESCRIPTION

Again, the present invention deals primarily with apparatus and methods of sensing and signal processing for a Coriolis type mass flow meter and, more particularly, for distinguishing between mass flow effects and boundary condition effects to produce an output signal that is substantially free from zero shifts due to boundary condition effects.

The following terms are defined for purposes of the present discussion:

Sensitivity—The slope of the output signal level versus mass flow rate relationship of a Coriolis mass flow meter. A typical unit of measurement is output signal level per unit mass flow rate (e.g., milliamps/kg/min).

Zero—The output intercept of the output signal level versus mass flow rate relationship of a Coriolis mass flow meter. A typical unit of measurement is output signal level indicated (e.g., milliamps) when the actual flow rate is zero.

Zero Shift—Any change in the indicated output signal level of the meter not caused by a change in mass flow rate.

Conduit or Flow Conduit—The device interacting between the fluid to be measured and the sensor or sensors measuring motion, usually a conduit or tube through which or around which fluid is caused to flow, but broadly including any arbitrary surface over, under or through which fluid flows.

Mass Flow Effects (Coriolis Effects)—Effects on the flow conduit due to Coriolis forces acting to alter the amplitude and or phase relationship of the motion at a given location on the flow conduit.

Boundary Conditions (also "BCs")—The physical properties associated with the ends of the active portion of the flow conduit, including properties such as stiffness, mass and damping.

Boundary Condition Effects—Effects on the flow conduit due to changes in the boundary conditions in combination with the driven mode of vibration, including changes such as stiffness, mass and damping. Typically, these effects alter the amplitude or phase relationship of the driven motion at a given location on the flow conduit, that can be interpreted as a mass flow related signal using traditional signal processing techniques.

Driven Mode (also "Dm")—The mode of vibration of the flow conduit that is intentionally excited as necessary to cause Coriolis forces.

Coriolis Mode (also "Cm")—The mode of vibration of the flow conduit that is a response to Coriolis forces.

Boundary Condition Mode (also "BCm")—The mode of vibration of the flow conduit that is a response to the driven mode of vibration in combination with boundary condition effects.

While the present invention applies to any type of Coriolis flow meter employing any shape or type of flow conduit, such as a dual-conduit bending mode type, or single-conduit radial mode type flow meter, a single straight conduit operating in the first bending mode of vibration (in accordance with a preferred embodiment) will be illustrated and described.

Embodiment No. 1 (A Preferred Embodiment)

Figure 1:
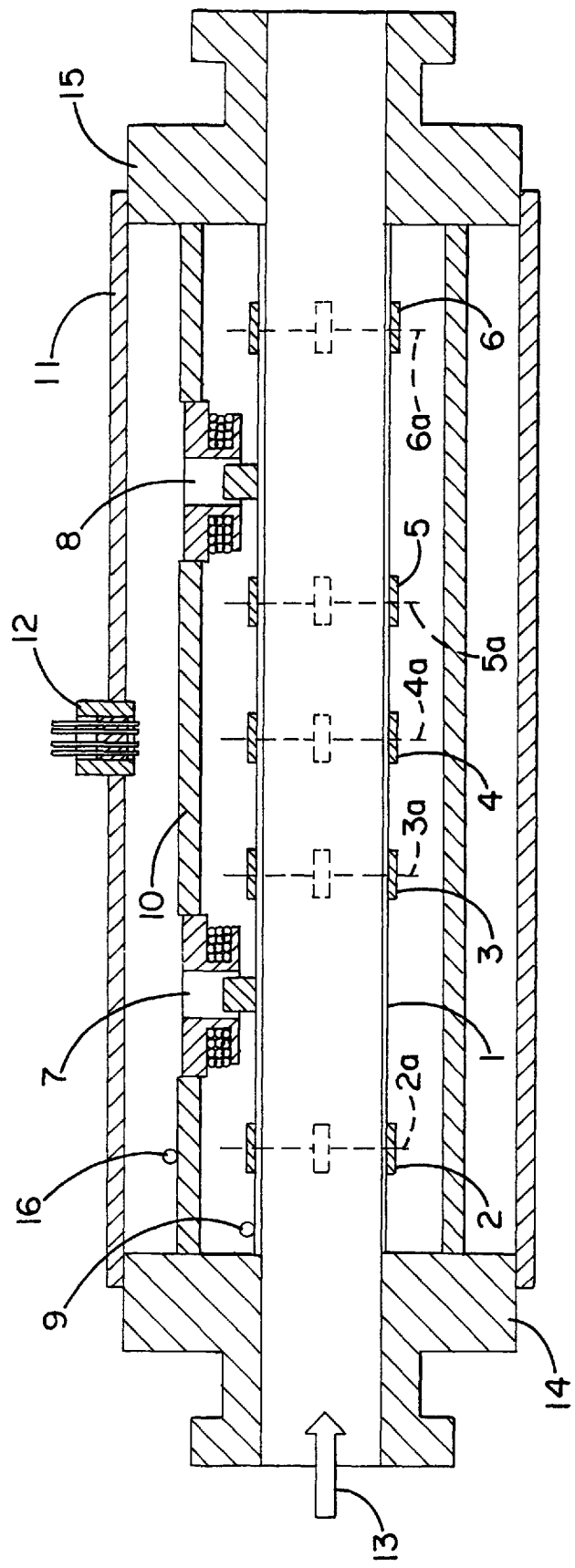
FIG. 1 illustrates a cross sectional view of a flow meter according to the preferred embodiment.

FIG. 1 depicts a cross sectional view of a flow meter according to the preferred embodiment. The general assembly of the preferred embodiment will now be described in conjunction with FIGS. 1 and 6. Flow conduit 1 is illustrated as being a single straight tubular conduit made of strong resilient material, such as stainless steel or titanium. Flow conduit 1 is fixedly attached at both ends to inlet manifold 14 and outlet manifold 15 by means of welding or brazing. Inlet and outlet manifolds 14, 15 act to terminate the active portion of flow conduit 1 and to interconnect with the user's pipe fittings (not shown) and with the bracket 10 and the case 11. Bracket 10 is fixedly attached to both manifolds 14, 15 by welding or brazing, and acts to hold wiring and force drivers 7, 8. Force drivers 7, 8 are illustrated as being magnet/coil pairs, the magnets of which are fixedly attached to flow conduit 1 and the coils of which are fixedly attached to bracket 10. Force drivers 7, 8 act to excite and maintain the driven mode of vibration of flow conduit 1, and to apply reference excitations for sensitivity determination as explained hereinafter.

Bracket 10 is preferably designed to resonate in conjunction with flow conduit 1 to achieve at least a partial state of "balance" so as to minimize the energy necessary to maintain the driven mode vibration. The resonance of bracket 10 is not a necessary condition; however, it is normally-accepted design practice to minimize the power necessary to run the device. Since bracket 10 is not affected by changes in fluid parameters, the state of balance herein achieved is not perfect. The remnant imbalance that normally causes zero drift problems with changing boundary conditions is acceptable in the present invention.

Case 11 acts to protect the assembly, enclosing it in a pressure tight case capable of maintaining a prescribed amount of pressure or vacuum. Preferably the annular space inside the case 11 and outside the flow conduit 1 is filled with inert gas, such as helium.

Feed through 12 is fixedly attached to case 11 by welding or brazing and acts to convey signals (electrical, optical or of other type) between the sensor components and electronic processing circuitry (to be described).

Flow conduit 1 is instrumented with motion sensors 2 through 6 that detect some type of measurement parameter, such as displacement, velocity, acceleration, strain or stress. In the preferred embodiment, each of sensors 2 through 6 are four strain gages arranged circumferentially around the flow conduit 1 and interconnected in a bridge circuit configuration to measure the strain of the flow conduit at their respective locations 2a through 6a.

Inlet sensor 2 is mounted near the inlet end of flow conduit 1 to measure the strain of flow conduit 1 at its location 2a. So mounted, sensor 2 can measure a large portion of boundary condition effects and a smaller portion of Coriolis effects associated with the inlet end of flow conduit 1. Inlet sensor 3 is mounted part way between the inlet end of the flow conduit 1 and its center to measure the strain at its location 3a. So mounted, sensor 3 can measure a large portion of Coriolis mode effects and a lesser portion of boundary condition effects. Center sensor 4 is mounted near the center of flow conduit 1 to measure the strain associated with that location 4a. So mounted, sensor 4 measures a large portion of the driven mode of vibration and a lesser portion of Coriolis mode effects and boundary condition effects.

Similarly, outlet sensor 5 is mounted part way between the center location 4a and the outlet end of flow conduit 1 to measure the strain associated with that location 5a. So mounted, sensor 5 can measure a large portion of the Coriolis mode effects and a lesser portion of boundary condition effects. Outlet sensor 6 is mounted near the outlet end of flow conduit 1 to measure the strain associated with its location 6a. So mounted sensor 6 can measure a large portion of the boundary condition effects and a smaller portion of Coriolis effects associated with the outlet end of flow conduit 1.

In this preferred embodiment, sensors 2 through 6 are illustrated as being 4-leg strain gages arranged in bridge circuits on the preferred embodiment, however alternate embodiments can use alternate numbers of strain gages arranged in different configurations. Similarly, motion sensors 2 through 6 can alternately be velocity sensors, such as magnets and coils, accelerometers or displacement sensors. There is an advantage in using strain gages as described, since bracket 10 is designed to resonate in conjunction with flow conduit 1, albeit with imperfect balance. Sensors that are not referenced to the motion of bracket 10 are thereby advantageous, such as the strain gages described or accelerometers or inertial reference sensors of any type.

Temperature sensor 9 is mounted in conjunction with flow conduit 1 to measure its temperature. Similarly temperature sensor 16 is mounted in conjunction with bracket 10 to measure the temperature of the bracket and the force drivers 7, 8. Circuit component 76 conditions temperature signals from temperature sensors 9, 16 and subsequently relays that information to component 61 and on to component 71. While temperature sensors 9, 16 are used in the preferred embodiment, they are not a necessary part of the invention and are used only for user output convenience or performance improvements, such as temperature compensation, as explained hereinafter.

The embodiment of FIG. 1 is thereby arranged to convey mass flow rate 13 through flow conduit 1 from inlet manifold 14 to outlet manifold 15; however, mass flow rate 13 can be measured in either direction.

The operation of the preferred embodiment will now be described in conjunction with FIGS. 1 through 6. Flow conduit 1 is caused to vibrate in a first order bending mode of vibration (Dm) by force drivers 7, 8 in conjunction with drive and reference exciter 72. Again, force drivers 7, 8 are illustrated as being magnet and coil pairs and are excited by substantially sinusoidal excitation signals from drive and reference exciter 72 in the appropriate phase and amplitude as necessary to excite the driven mode of vibration to a prescribed amplitude.

Figure 2:
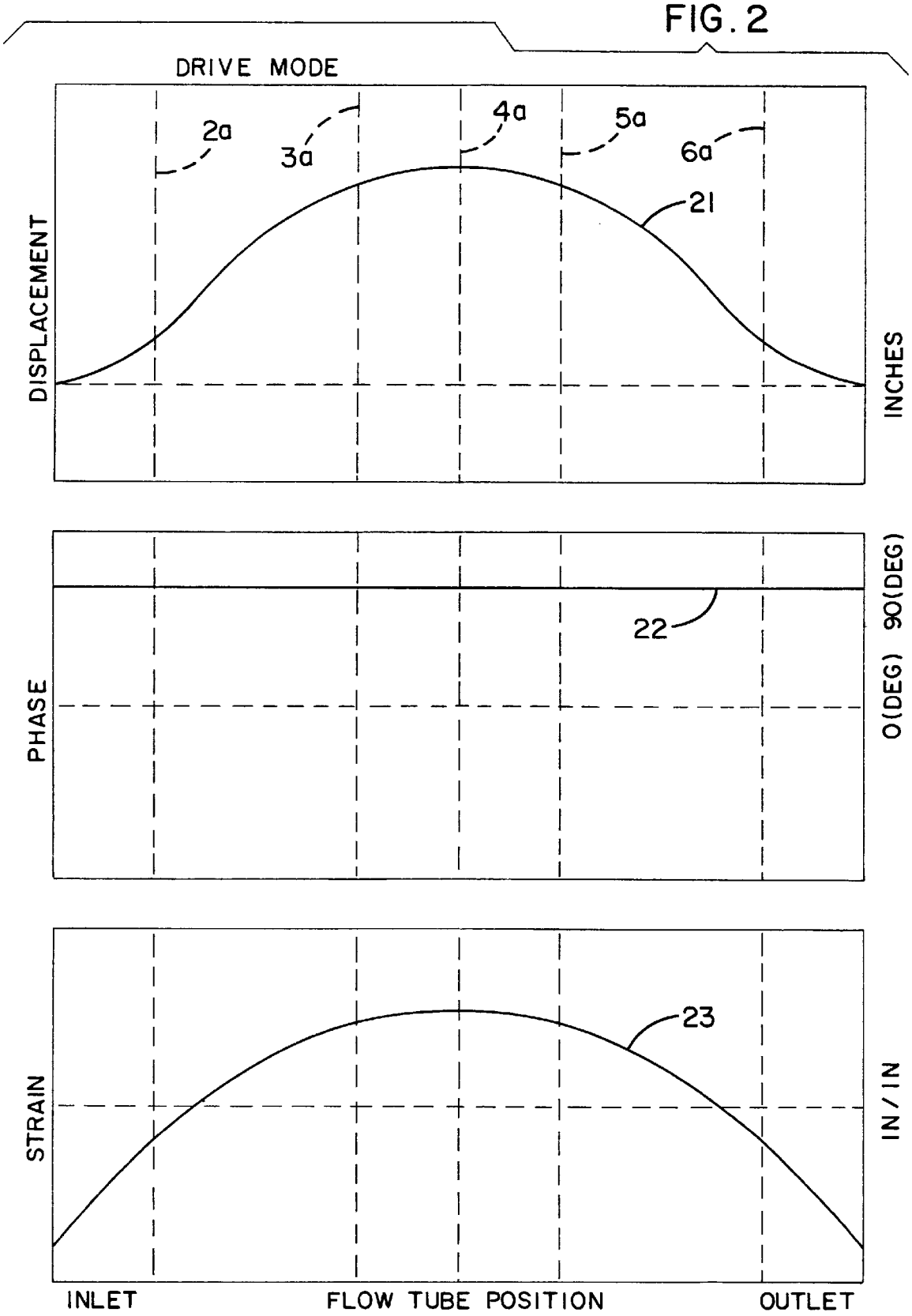
FIG. 2 illustrates the peak amplitude, phase and strain relationship of the flow conduit due to Dm according to the preferred embodiment.

FIG. 2 depicts the displacement, phase and strain amplitude distribution along flow conduit 1 associated with the driven mode of vibration just described. Displacement curve 21 depicts the peak displacement amplitude as a function of conduit position along the length of flow conduit 1. Phase curve 22 depicts the phase distribution along flow conduit 1 associated with the amplitude curve 21, where the phase angle is referenced to the phase of the driving force being supplied by force drivers 7, 8. Inspection of phase curve 22 indicates that the entire conduit is in substantially a 90° phase relation with the driving force, that is indicative of driving a high "Q" resonant structure at its natural resonant frequency. Strain curve 23 depicts the strain distribution (in the axial direction) along flow conduit 1 associated with the amplitude curve 21. The locations 2a through 6a (illustrated as vertical dashed lines) of sensors 2 through 6 are also depicted in FIG. 2 to indicate the relative values of displacement, phase and strain that can be sensed at their locations 2a through 6a.

Figure 3:
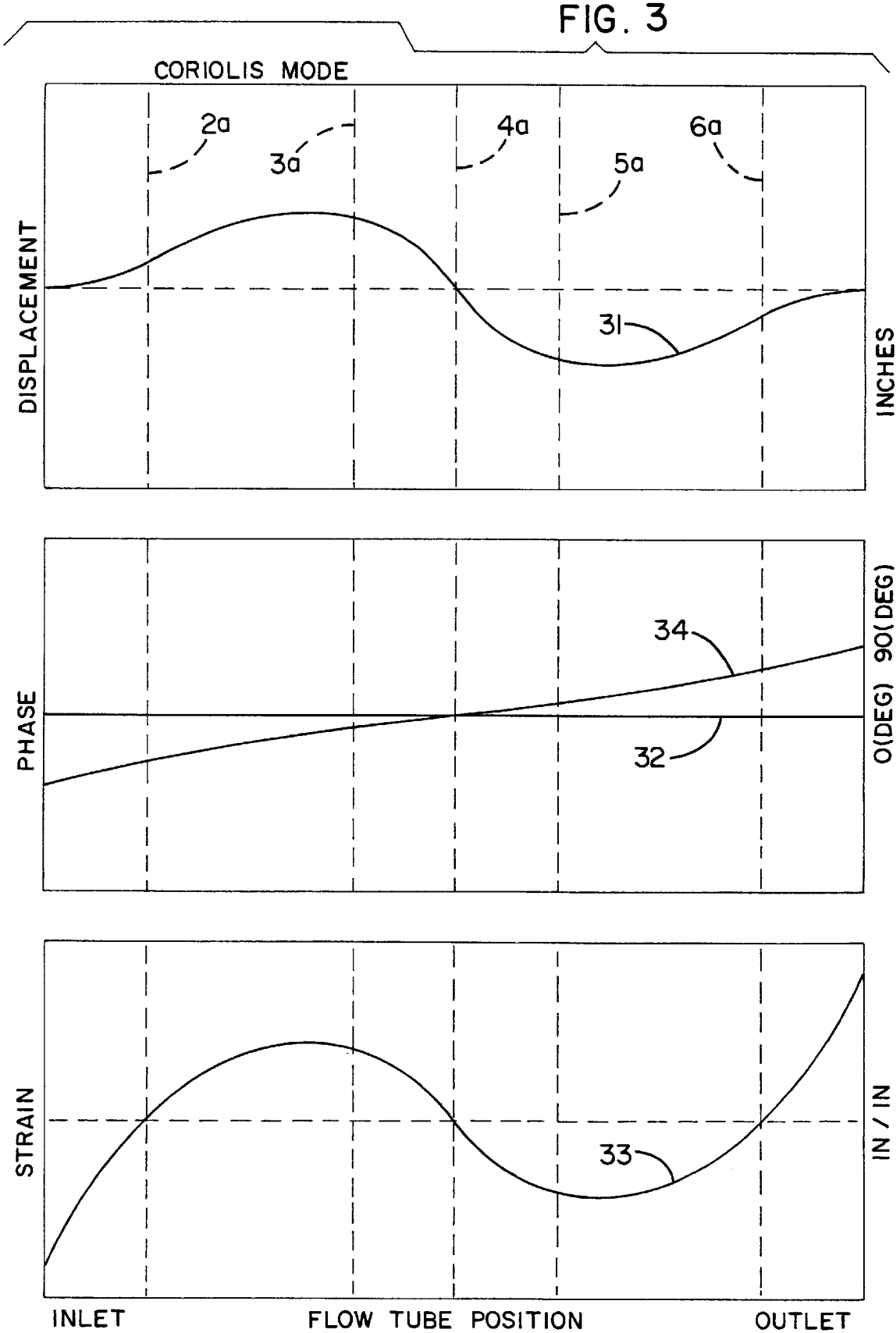
FIG. 3 illustrates the peak amplitude, phase and strain relationship of the flow conduit due to Cm according to the preferred embodiment.

Similarly, FIG. 3 depicts the displacement, phase and strain amplitude distribution along flow conduit 1 associated with the Coriolis mode of vibration due to a prescribed amount of mass flow rate (for clarity, shown without the driven mode of vibration that is normally present and superimposed thereon). Displacement amplitude curve 31 depicts the peak displacement amplitude as a function of conduit position along the length of flow conduit 1. Phase curve 32 depicts the phase distribution along flow conduit 1 associated with the displacement amplitude curve 31, where the phase angle is referenced to the phase of the Coriolis force distribution being supplied by the moving fluid in combination with the driven mode of vibration. Inspection of phase curve 32 indicates that the entire conduit is in substantially a 0° phase relation with the Coriolis force distribution that is indicative of driving a high "Q" resonant structure at a frequency lower than its natural resonant frequency. Phase curve 34 depicts the phase distribution that can result from the combination of Coriolis displacement curve 31 and its phase relationship curve 32, with the drive mode displacement curve 21 with its phase relationship curve 22. This resultant phase relationship curve 34 is what is typically measured with traditional signal processing methods that use phase or time delay measurement methods.

Strain curve 33 depicts the strain distribution (in the axial direction) along flow conduit 1 associated with the displacement amplitude curve 31. The locations 2a through 6a of sensors 2 through 6 are also depicted in FIG. 3 to indicate the relative values of displacement, phase and strain that can be sensed at their locations 2a through 6a.

Figure 4:
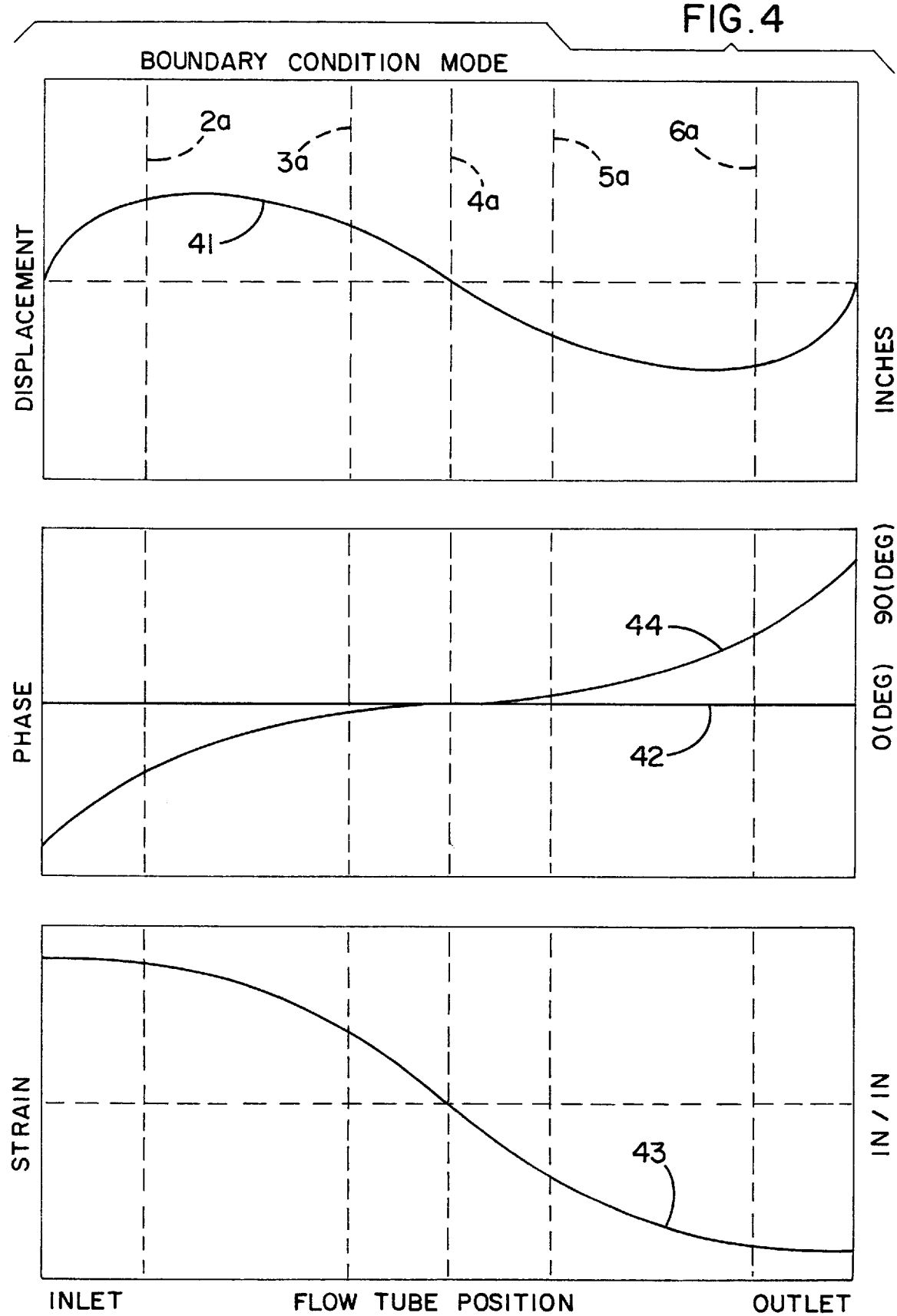
FIG. 4 illustrates the peak amplitude, phase and strain relationship of the flow conduit of the preferred embodiment due to BCm where both ends of the flow conduit experience boundary condition effects of an equal and opposite nature.

Similarly, FIG. 4 depicts the displacement amplitude, phase and strain distribution along flow conduit 1 associated with a boundary condition mode of vibration (for clarity, shown without the driven mode of vibration that is normally present and superimposed thereon). Displacement amplitude curve 41 depicts the peak displacement amplitude as a function of conduit position along the length of flow conduit 1. Phase curve 42 depicts the phase distribution along flow conduit 1 associated with the displacement amplitude curve 41, where the 0° phase relation shown is referenced to the phase of the "excitation" being supplied by the driven mode of vibration as altered by the boundary conditions. These excitations therefore derive from either a translation and/or rotation (shear and/or moment) of one or both ends of the flow conduit. Phase curve 44 depicts the phase distribution that can result from the combination of boundary condition displacement curve 41 and its phase relationship curve 42, with the drive mode displacement curve 21 with its phase relationship curve 22. This resultant phase relationship curve 44 is typically measured with traditional signal processing methods that use phase or time delay measurement methods.

Since the boundary conditions can be arbitrarily altered by the end user, the phase curve 44 has no set relationship with the phase curve 34. In other words, the boundary condition mode may or may not occur at an amplitude, and in a phase relationship that is detrimental to the proper sensing of the Coriolis mode motion. This is one of the fundamental aspects of the problem that is overcome by the present invention. If the boundary conditions change, the magnitude of curve 41 may change, and the phase relationship between curves 44, 34 may change giving rise to measured motion on flow conduit 1 that may be erroneously interpreted as mass flow rate.

The boundary conditions both absorb and reflect vibrational energy from the driven mode of vibration back into the vibrating flow conduit system. The proportion of vibration that is absorbed versus that which is reflected is controlled by the properties of mass, stiffness or damping of the boundary conditions. If the boundary conditions were infinitely stiff (exclusively a theoretical condition), 100% of the driven mode vibration is reflected back into the flow conduit system. In this case the motion of the flow conduit 1 is governed solely by driven mode motion and Coriolis effects, the traditional assumption.

However, since the properties of the boundary conditions can be changed arbitrarily, an unpredictable portion of the driven mode vibration can be altered by the boundaries, thereby causing excitation on flow conduit 1 that alters the amplitude and phase distribution of the driven mode motion causing a boundary mode of vibration that (using traditional signal processing techniques) can be erroneously interpreted as mass flow. This boundary mode of vibration can be predicted using FEA or modal analysis techniques and the resulting relative amplitude and phase distribution associated therewith can be characterized. An example of the results of this type analysis is shown in the curves 41 through 44 of FIG. 4.

For the example of FIG. 4, the boundary condition "excitation" used for the exemplary analysis is that of equal excitation forces on the ends of flow conduit 1, at the driven mode frequency. This represents an unusual but one of the worst types of boundary conditions, since the flow conduit 1 is excited in a manner very closely, but not precisely, resembling that due to the Coriolis forces themselves. This is understandable, since the boundary condition effects are caused by the Drive mode in combination with the boundary conditions and can be characterized as translational and/or rotational (shear and/or moment) motion applied to the ends of flow conduit 1, whereas Coriolis effects have their origin as a distributed force all along flow conduit 1, thereby giving rise to a quantifiable and measurable difference between the two.

Strain curve 43 depicts the strain distribution (in the axial direction) along flow conduit 1 associated with the displacement amplitude curve 41 from the boundary condition mode. The positions 2a through 6a of sensors 2 through 6 are also depicted in FIG. 4 to indicate the relative values of displacement, phase and strain that can be sensed at their locations.

This example of equal boundary condition excitation is given as a "worst case scenario" to show the effectiveness of the present invention. In practice, boundary conditions will seldom occur precisely in this manner but more likely in an asymmetrical manner usually with more effect occurring from one boundary condition of flow conduit 1 than the other. An alternate embodiment is hereinafter described involving an asymmetrical boundary condition mode that can be substantially corrected using fewer motion sensors along the length of the flow conduit 1. It should be noted that the displacement, phase and strain distribution curves given herein are exemplary and can change significantly depending on the design of flow conduit 1, in that length, diameter, thickness, material, curvature (non straight conduit design), lumped masses and driven mode of vibration (e.g., 2nd or 3rd order bending, torsional or radial mode) are all factors in the determination of the shape of these curves, and many variations are contemplated and anticipated.

Comparison of Coriolis mode related curves 31 through 34, to the boundary mode curves 41 through 44 indicates that they are similar but not precisely the same. The difference between these curves allows the present invention to distinguish between actual mass flow related signals and changing boundary condition related error signals.

For example, traditional Coriolis-type flow meters normally employ two sensors to measure the motion (usually the velocity) at positions part way between the conduit ends and its center (such as the positions 3a, 5a of sensors 3, 5 on the preferred embodiment). Normally the amplitude difference or phase difference or time delay difference is then measured between these two positions, and this one measurement value is assumed to indicate mass flow rate. Inspection of FIGS. 3 and 4 indicates that the use of this traditional method produces some finite difference value in either case (intersections of locations 3a, 5a with the curves of FIG. 3 and FIG. 4) but the user cannot know whether the indication is actual mass flow rate (as in the case FIG. 3) or a shifted zero due to boundary condition effects (as in the case of FIG. 4). Therefore, a second piece of information (measurement) is needed to resolve the problem since there are at least two unknowns in the traditionally-measured signal (e.g., mass flow effects and boundary condition effects).

In the preferred embodiment, the second measurement comes from the additional sensors 2, 6 that are located nearer to their respective ends of flow conduit 1 than are sensors 3, 5, and will therefore measure a different proportion of the strain related to boundary condition effects versus the strain related to mass flow effects. Inspection of FIG. 4 indicates that the displacement, phase and strain associated with the positions 2a, 6a of sensors 2, 6 have significantly different values relative to those locations 3a, 5a of sensors 3, 5, compared to those of FIG. 3. Therefore, measurements taken with sensors 2, 6 contain different proportions of the two unknowns (Coriolis mode signal versus boundary condition mode signal) than do measurements taken with sensors 3, 5. These measurements then can be viewed as a system of two equations with two unknowns that can be solved by a variety of methods herein described.

For clarity, the term "measurement" can here include a differential measurement as in the phase or time delay or amplitude difference between two motion sensors. In addition a measurement can include a single value taken at one sensor. Each of these measurements results in a single value, and according to the present invention, at least two such measurements are required to differentiate between the Coriolis mode component, and boundary mode component.

Inspection of strain curve 33 shows that the measured stain values, sensed by sensors 2, 6 at their respective locations 2a, 6a, are nearly zero. This fortuitous circumstance can be used to maximize the accuracy of the results, since the signals from sensors 2, 6 primarily contain only drive mode information and boundary condition mode information, and very little if any Coriolis mode information. An inspection of strain curve 43 shows that the values sensed by sensors 2, 6 at their locations 2a, 6a are nearly twice the value of the strain sensed by sensors 3, 5 at locations 3a, 5a. These differences then allow for the formation of the independent equations to solve for the unknowns (e.g., Coriolis effect versus boundary condition effect).

Figure 5:
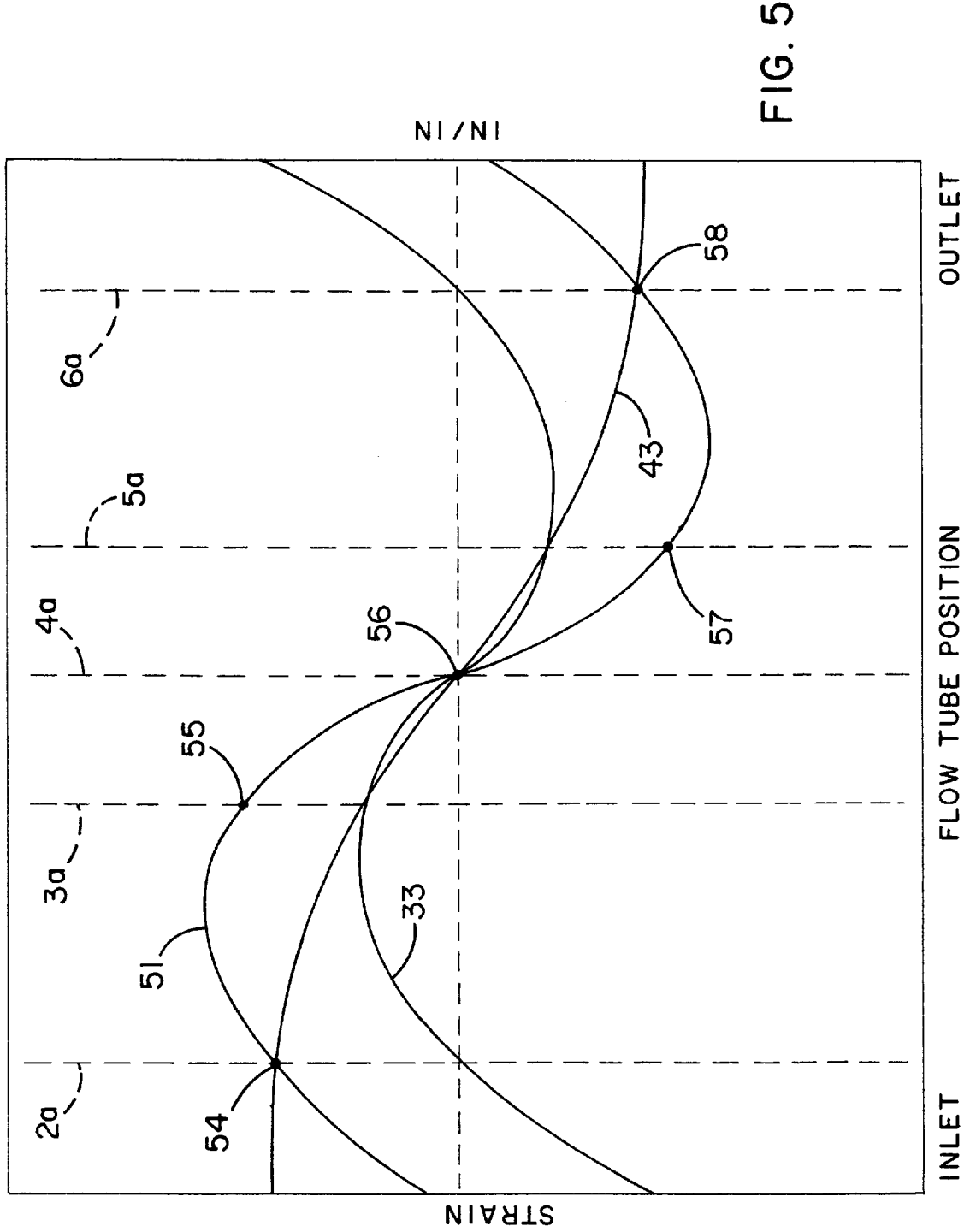
FIG. 5 illustrates curve fit data functions representing a prescribed Cm component, a prescribed Bm component that is symmetrical in nature and a combined, measured function.

FIG. 5 depicts three mathematical functions (curves) describing strain amplitude distribution along flow conduit 1 under the condition of some finite amount of mass flow rate (curve 33 analogous to that of FIG. 3) and some finite amount of boundary condition effects (curve 43 analogous to that of FIG. 4). Function curve 51 is therefore a mathematical function that represents the actual measured strain distribution along flow conduit 1 (if every point along the length is measured) under the circumstance of a combination of both Coriolis effects and boundary condition effects (the combination of curve 33, 43). The actual measured data of curve 51 therefore contain the two types of information (Coriolis effects and boundary condition effects) that need separation. Measured values 54 through 58 therefore represent the actual acquired motion data from the flow conduit 1 containing these two types of information. It is apparent from curve 51 that more measurement locations along flow conduit 1 increases the accuracy of the defined curve 51, and therefore results in higher accuracy of the resulting curve fits for curves 33, 43.

Figure 6:
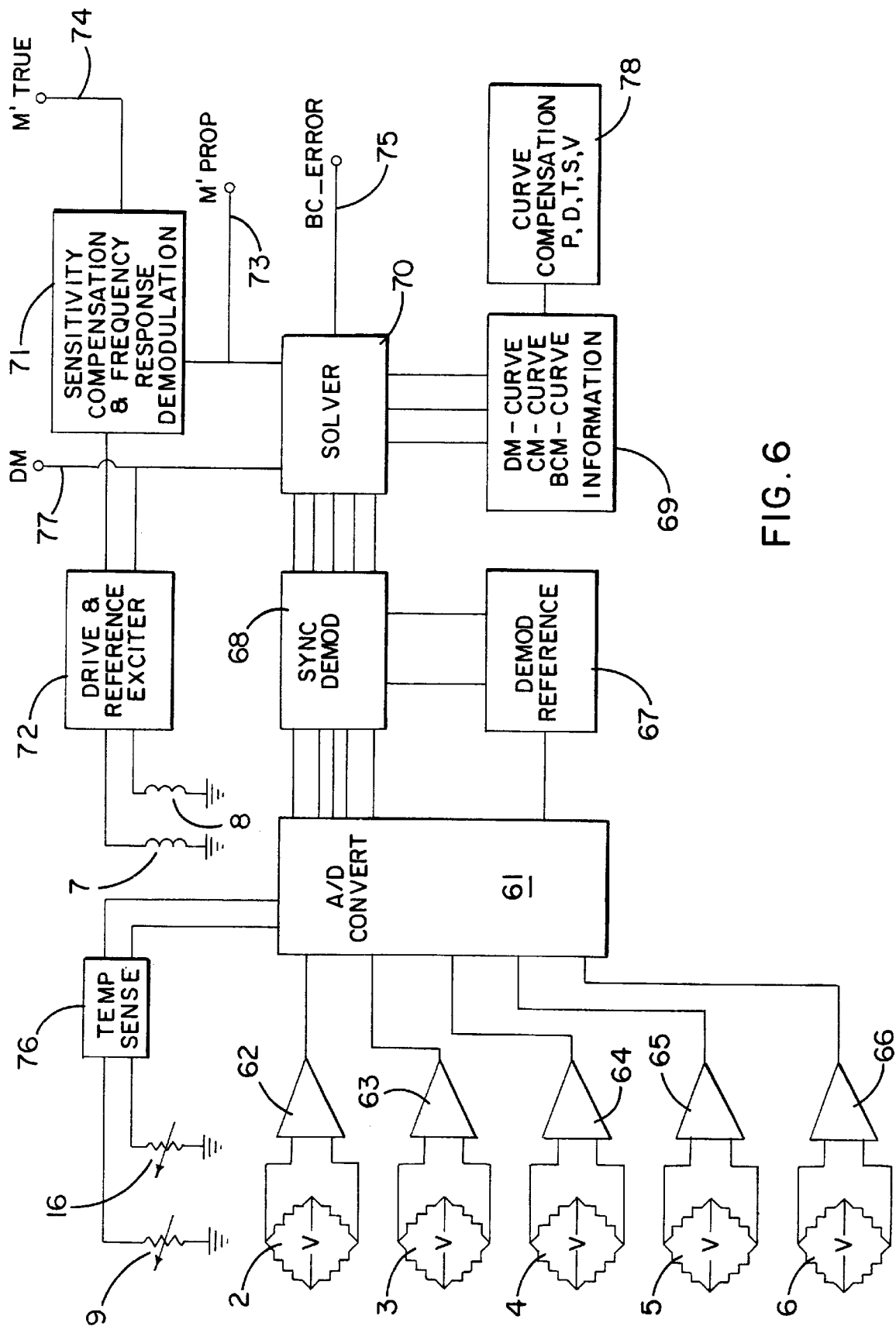
FIG. 6 illustrates a diagram of signal processing circuitry employable in conjunction with the preferred embodiment.

FIG. 6 shows a functional diagram of signal processing circuitry that can be used in conjunction with the preferred embodiment. As shown in FIG. 6, sensors 2 through 6 are strain gages arranged in four-leg bridge circuits that are conditioned by components 62 through 66 respectively. The output signals from components 62 through 66 are converted to digital values by converter component 61. It is often advantageous to reference the measurements taken from the flow conduit 1 relative to the motion at a particular location that is least affected by other disturbances, such as Coriolis effects or boundary condition effects. In the preferred embodiment in which the driven mode of vibration is a first order bending mode, the center location 4a of sensor 4 is the best location for a reference. Therefore, the motion information from sensors 2, 3, 4, 5, 6 is synchronously demodulated in circuit component 68, using the motion of sensor 4 as a reference. The motion of sensor 4 is conveyed to component 67 that transforms that motion into a reference signal (or a plurality of reference signals) for the synchronous demodulator 68. The exact type of transformation will depend on the type of motion sensors used and the desired phase relationship of the reference signal. By selecting a 90° phase transformation for a reference signal in component 67, the synchronous demodulator component 68 will extract strain amplitude values containing both Coriolis effect information and boundary condition effect information but substantially devoid of drive mode information. This eliminates the drive mode variable from Equation (1), thereby simplifying the next step of curve fitting. Synchronous demodulator 68 preferably uses a plurality of demodulators, a second one of which then demodulates the drive mode information from the signals from sensors 2 through 6 using a second reference signal from component 67 selected to maximize the drive mode information. This drive mode information Dm 77 is then used as feedback to the drive and reference exciter component 72.

Solver 70 performs the function of curve fitting the data and thereby solving for any or all of the magnitudes of (a) drive mode component, (b) Coriolis mode component and (c) boundary condition mode component. For this example, strain amplitude data are taken during a vibration cycle of flow conduit 1 resulting in the values of 54 through 58 in FIG. 5, corresponding to the positions 2a through 6a of motion sensors 2 through 6 on flow conduit 1. Value 54 represents a scaled version of the strain value detected at motion sensor 2. Value 55 represents a scaled version of the strain value detected at motion sensor 3. Value 56 represents a scaled version of the strain value detected at motion sensor 4, and since this position is the reference position its value is taken to be zero by which the other values are referenced, although it can alternatively be a real value. Value 57 represents a scaled version of the strain value detected at motion sensor 5. Value 58 represents a scaled version of the strain value detected at motion sensor 6. Additional sensors at additional locations (not shown) along flow conduit 1 quantifies additional points along curve 51 and thereby more accurately define it, resulting in higher accuracy in the results.

With these five values (54 through 58) determined (and shown graphically in FIG. 5), the solver 70 fits the data to the anticipated function curves of Equation (1). Since the drive mode information is preferably removed from those signals to be used for Coriolis mode determination, by synchronously demodulating at the proper phase relationship, Equation (1) can therefore be reduced to a simpler version (given below as Equation (2)) involving neither the drive mode information nor time, since the time is determined by the vibration cycle and the synchronous demodulation reference.

$$F(x) = Cm(x) + BCm(x) \qquad (2)$$

where:

$F(x)$ is the amplitude of the measured motion at position $(x)$;

$Cm(x)$ is the amplitude of the motion at position $(x)$ due to Cm; and $BCm(x)$ is the amplitude of the motion at position $(x)$ due to BCm.

Similarly, the drive mode information can be isolated by synchronously demodulating the motion information at the proper phase relationship thereby reducing Equation (1) to a simpler version similar to Equation (2), only involving the drive mode information Dm.

Many curve fitting methods are known and well documented and available for use to determine the magnitude of one or more characterized components (e.g., the Cm component in Equation (2), above) that may be present in a data set. These methods include simultaneous solutions of non linear equations, curve fitting routines, and application of particular algorithms to the data to separate the Coriolis mode component from the boundary condition component, or other error components as hereinafter described.

The highest accuracy can be attained by accurately characterizing the curves of all the possible components that can occur in the data (e.g., the Coriolis mode component, the drive mode component, the boundary condition mode component, and any other known component). With all the possible components known and characterized, numerical solutions can accurately determine the relative magnitudes of each component that may be present in a given data set. Therefore in the preferred embodiment, this is the method used and all known components are characterized and submitted to the solver for solution.

In lieu of characterizing all the possible components, as a minimum the Coriolis mode component can be characterized, and submitted to a curve fitting routine for determination of the "best fit" of the Coriolis mode shape to a given data set. The closeness of the fit to the data can be determined therefrom usually in the form of the "root of the mean square deviation" or "R" value as is commonly used in curve fitting terminology. This R value can also be employed as a compensation value to the Coriolis mode component value since it represents the magnitude of the deviation of the data from the anticipated characteristic shape of the Coriolis mode shape. The use of the R value is not the preferred method however, since both random noise in the data, and boundary condition mode in the data can alter the R value. By accurate characterization of all the anticipated components, the numerical solution accurately discerns between the similar shapes of the Coriolis mode component and the boundary condition mode component.

Therefore, the preferred method is that of curve fitting the data to the anticipated characteristic curves to determine (as a minimum) the magnitude of the Coriolis mode component. The preferred method of curve fitting involves the use of the Gauss-Newton method as described in "C-Curve fitting and Modeling For Scientists And Engineers" by Dr. Jens Georg Reich, McGraw Hill, ISBN 0-07-051761-4. This method involves the use of the anticipated characteristic curves involved that, in the case of the preferred embodiment, is the general form of functions $Cm(x)$ and $BCm(x)$ above in Equation (2). These functions are the mathematical representations of the expected Coriolis mode motion and the boundary condition mode motion such as the curves in FIGS. 3 and 4. If strain gages are used for motion sensors (as in the case of the preferred embodiment), then mathematical representations of the strain curves 33, 43 are used for the anticipated functions.

As an example, strain curves 23, 33, 43 can be accurately fit to third order polynomials of the following form:

$$Cm(x) = M'prop*(c1 + c2*x + c3*x^2 + c4*x^3) \qquad (3)$$

$$BCm(x) = BC\_error*(c5 + c6*x + c7*x^2 + c8*x^3) \qquad (4)$$

$$Dm(x) = Dm*(c9 + c10*x + c11*x^2 + c12*x^3) \qquad (5)$$

where:

M'prop is the amplitude of the Cm component (proportional to mass flow);

BC_error is the amplitude of the BCm component (error signal);

Dm is the amplitude of the Dm component; and c1 to c12 are coefficients determining the shape of each curve.

With regard to the form of the anticipated characteristic curves of Equations (3), (4) and (5), different order polynomials can be used as well as other types of functions such as those involving trigonometric parameters (such as sine, cosine or tangent) exponentials and others. The particular functions used to describe the anticipated characteristic curves of Equations (3), (4) and (5) can be determined by the designer.

Alternately, if displacement amplitude measurement methods were used instead of strain measurements, then the displacement amplitude curves 21, 31, 41 are used for the anticipated functions in the curve fitting routine.

These anticipated characteristic strain curves (23, 33, 43 represented by Equations (3), (4) and (5), above) are determined by analysis, experiment or both, and subsequently stored in circuit component 69 of FIG. 6 for use by the solver 70. In the preferred embodiment, the drive mode component is removed from the data used for Coriolis component determination for simplification however this is not necessary, since the drive mode curve 23 can also be characterized (Equation (5) above) and stored in component 69 and subsequently solved for. In the preferred embodiment, solving for the driven mode component is done separately by synchronously demodulating the conduit motion with a reference in component 68 that substantially eliminates Coriolis and boundary condition modes such as the motion from sensor 4. This drive mode component determination can therefore be done in parallel with or alternately with the Coriolis mode component determination. In the preferred embodiment these are done in parallel.

With regard to solving for the Coriolis mode component, solver 70 then uses the anticipated characteristic curves 33, 43 represented by Equations (3) and (4) above (along with their first and second derivatives as required by the Gauss-Newton method for curve fitting) , and by application of the aforementioned curve fitting routine, solves for the magnitude of the anticipated characteristic curves that may be present in the data set, thereby separately determining the magnitudes of the Coriolis mode component and the boundary condition mode component that are present in the data set. The magnitude of the Coriolis mode component (M'prop) as solved by component 70 therefore represents a value (M'prop 73) proportional to the mass flow rate of the fluid in the meter at that moment. This signal M'prop 73 is therefore proportional to mass flow rate and substantially devoid of errors due to boundary condition changes. At the same time, the magnitude of the boundary condition mode can also be solved for, yielding a BC_error 75 signal proportional to the magnitude of the boundary condition mode component that can also be used by the end user.

FIG. 5 graphically represents the three curves used in this example namely, (a) the actual measured data curve represented by curve 51, and the two components of that measured data that are (b) the Coriolis mode curve represented by curve 33, the magnitude of that is solved for in component 70 yielding the output signal M'prop 73, and (c) the boundary condition mode curve represented by curve 43, the magnitude of which is solved for in component 70 yielding the output signal BC_error 75.

The drive mode information is also useful for feedback for the drive and reference exciter component 72 and therefore the drive mode component 77 is synchronously demodulated using a second reference from component 67 at a phase relation selected to maximize drive mode information. Synchronous demodulator 68 preferably includes multiple demodulators internally for this purpose, or can alternately multiplex the demodulation activity. The demodulated drive component is then conveyed to solver 70 that can solve for the drive mode component value Dm 77 as separate from other components, however, in general the drive mode component value is so large compared to the Coriolis mode or boundary condition mode components that this step is not always necessary and the demodulated value from component 68 can be used directly.

Depending on the design of the flow conduit and the type of motion being measured, the sensitivity of the flow conduit may change due to fluid and ambient parameters such as temperature, pressure, density, viscosity and conduit stress. Therefore, it may be necessary to compensate the M'prop 73 signal for any changes in this sensitivity value.

The M'prop 73 signal may then be further compensated if necessary in component 71 for any changes in the sensitivity of the flow conduit. Several direct methods can be used for this purpose including direct compensation for the temperature of the flow conduit, the stress on the flow conduit, the pressure, density or viscosity of the fluid in the flow conduit. Also the compensation methods described in U.S. Pat. No. 5,497,665, issued to Cage, et al. can be used whereby the M'prop 73 signal is adjusted by a signal proportional to the driven mode frequency raised to the power n where n is any number or integer. In the preferred embodiment, the method for sensitivity compensation is by the method described in U.S. patent application Ser. No. 08/569,967 to Cage, et al. in which a reference excitation is applied onto the flow conduit from component 72 in conjunction with force drivers 7, 8, and the response to that excitation is demodulated in component 71 resulting in a frequency response value of the flow conduit indicative of the sensitivity of the flow conduit at that moment. This response value is then used to augment the M'prop 73 signal resulting in a M'true 74 signal that is representative of mass flow rate fully compensated for sensitivity and for errors due to boundary condition changes.

As previously mentioned, higher accuracies can be achieved by adding more measurements along the flow conduit having different proportionate amounts of the unknowns that are to be solved for (e.g., mass flow effects and boundary condition effects). This adds more definition to curve 51 of FIG. 5, resulting in more accurate curve fitting. Also higher accuracies can be achieved by solving for the unknowns for the inlet half of the flow conduit separately from the outlet half. This alternate method can reduce the complexity of the anticipated characteristic curves of Equations (3) and (4) to two separate curves of lower complexity. Each half of the flow conduit motion are then solved independently, and the resulting Coriolis mode components for each half are subsequently combined together.

Similarly, higher order or more specific anticipated functions to characterize curves 33, 43 (Equations (3) and (4)) can be used to enhance accuracy such as higher order polynomials, or functions involving trigonometric functions or exponential functions instead of polynomials. The exact function used to mathematically describe the Coriolis mode or the boundary condition mode (and their derivatives) will depend on the design of the flow conduit 1 in that parameters such as length, diameter, wall thickness or material composition all contribute to the resultant shapes of the characteristic curves.

19

The preferred embodiment of the present invention has now been described involving apparatus and methods to determine the mass flow rate related component as apart from the boundary condition component from the motion information measured on a flow conduit.

Embodiment No. 2

Figure 7:
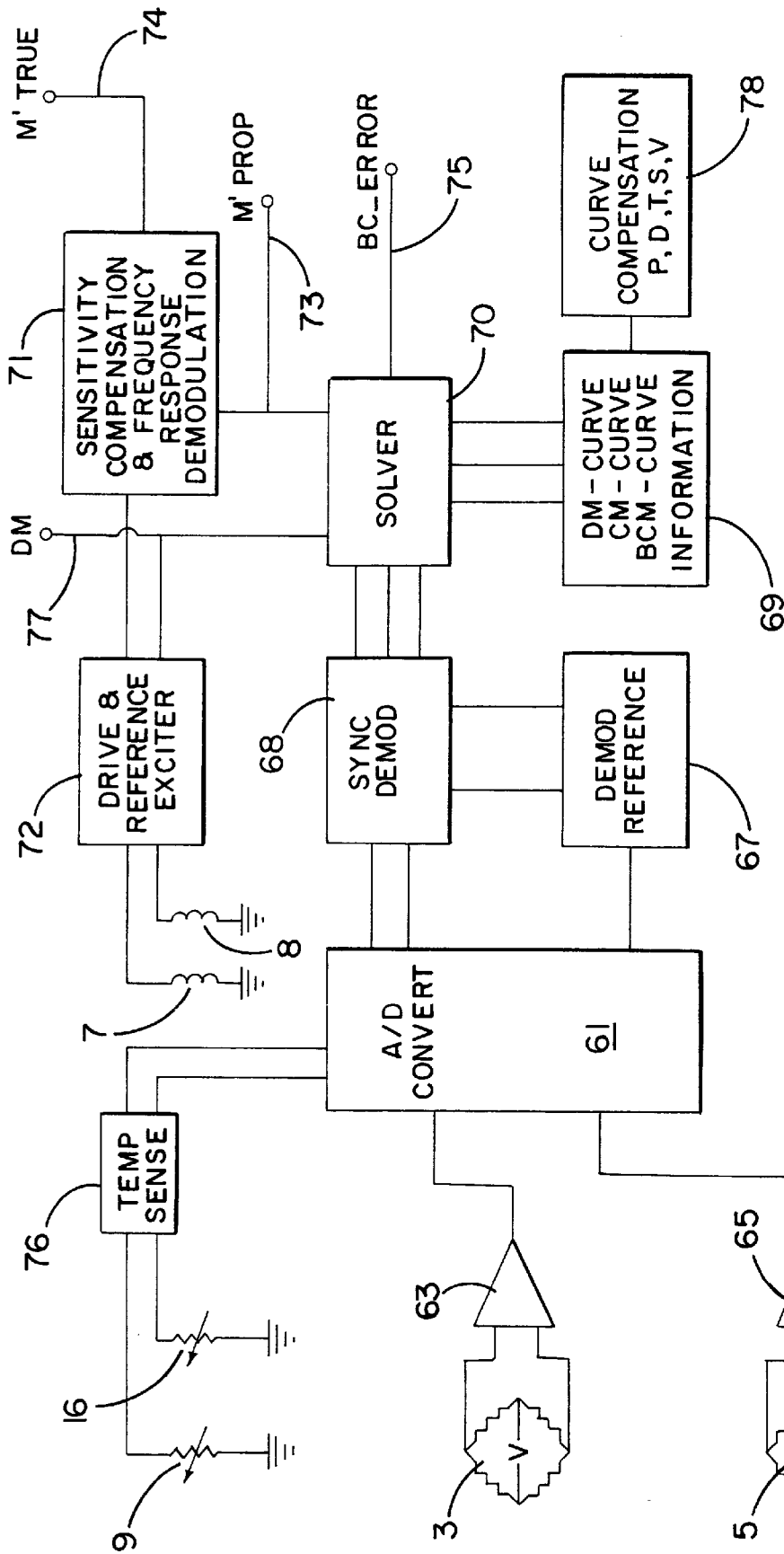
FIG. 7 illustrates a diagram of a circuit for signal processing employable in conjunction with an alternate to the preferred embodiment.
Figure 8:
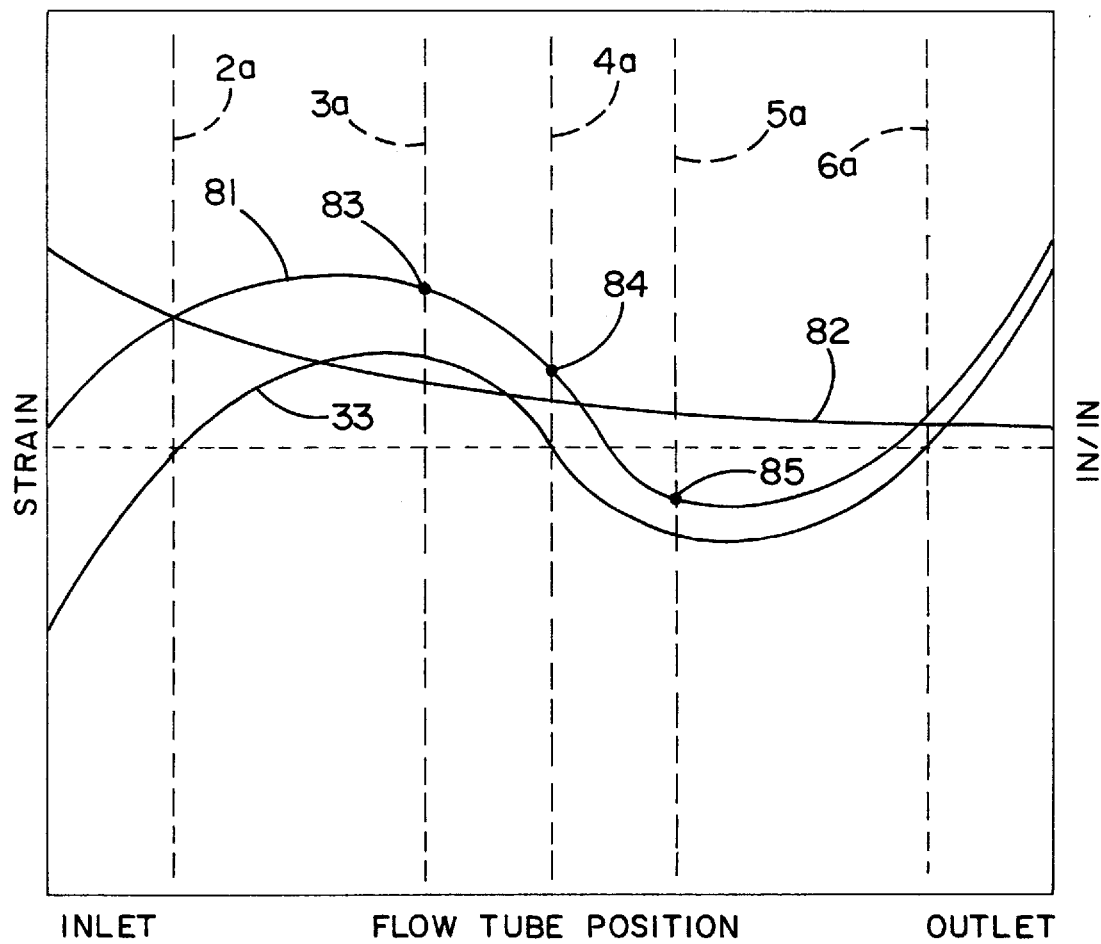
FIG. 8 illustrates curve fit data functions representing a prescribed Cm component, a prescribed BCm component that is asymmetrical in nature and a combined measured function.

As an alternate to the preferred embodiment, where five sensing locations are used, some of the functionality of the preferred embodiment can be achieved (although at reduced accuracy) with two sensing locations. Using the embodiment of FIG. 1 for this example, all parts can remain the same except that only two of the motion sensors are used. Therefore, FIG. 7 shows a functional signal processing diagram for this second embodiment where only sensors 3, 5 of FIG. 1 are used. In this example, the same components as those of FIG. 6 are used in the same way but with only the two sensors signals involved. FIG. 8 depicts mathematical function curves 81, 82, 33. Curve 81 represents the mathematical function curve of the actual measured data (if every point along the curve can be measured) . With only two sensors active (sensors 3, 5), the actual measured data points are 83, 85 on curve 81. The center point 84 can be determined with significant accuracy by calculation, by adding the two sensor signals 3, 5 together such that the drive mode component is magnified and the Coriolis mode component is minimized (summing same direction motion). This sum is then used as a reference when its value (or a phase-shifted version thereof) becomes zero represented by point 84. Therefore data point 84 is a calculated point based on the actual measured points but can be used with sufficient accuracy under many circumstances. It is better actually to measure the motion at the center location 4a instead of deducing the data by calculation. However, this second embodiment is herein described as a simplified version (and thus less costly) of the preferred embodiment at the cost of reduced accuracy.

Curve 82 represents the strain along flow conduit 1 due to an asymmetrical boundary condition mode, for example, if the boundary condition at the outlet end of flow conduit 1 is very rigid and the boundary condition at the inlet end became less rigid. Under this circumstance the strain related to the boundary condition mode is represented by curve 82 and shows higher strain values at the inlet end than at the outlet end. This asymmetrical boundary condition mode can be separated from the Coriolis mode component using this second embodiment, whereas a symmetrical boundary condition mode (as in the example of the first embodiment) is not as well determined and separated using this simplified embodiment.

Coriolis mode curve 33 is again represented here on FIG. 8 to show the strain effect of a prescribed amount of mass flow rate through flow conduit 1, and the combined effect is represented by curve 81 being the sum of Coriolis mode curve 33 and boundary condition mode 82. As in the case of the preferred embodiment, the magnitude of the Coriolis mode component (curve 33) needs to be determined from the actual data that also contain errors due to boundary condition mode 82. The same fundamental procedure is therefore followed as before.

The shape of Coriolis curve 33 and boundary mode curve 82 (and drive mode curve 21 not shown in FIG. 5) are determined by FEA, experiment or a combination of the two, and mathematical representations thereof are stored in circuit component 69 (along with their first and second derivatives as required by the Gauss-Newton method of curve fitting as earlier described) Preferably, each half (inlet and outlet) of flow conduit 1 is separately characterized and the two halves are curve fit separately. These mathematical representations can be in the form of Equations (3) and (4), or their equivalents or alternatives. Circuit component 70 then uses the information concerning the anticipated forms of the Coriolis mode shape and the boundary condition mode shape as stored in circuit component 69, and, using the Gauss-Newton method of curve fitting, finds the best fit of the measured data points 83, 84, 85 and thereby solves for the relative magnitude of the Coriolis mode component M'prop 73 that represents a value proportional to mass flow rate. Solving for each half of flow conduit 1 separately, the curve fitting routine is applied to the inlet half using data points 83, 84, and then to the outlet half using data points 84, 85, then the two solutions are combined. The magnitude of the boundary condition mode component can also be solved for in component 70 thereby representing the magnitude of the boundary condition mode BC_error 75 that can be useful information concerning the conditions of the boundaries.

As with the preferred embodiment, the drive mode information should also be solved for and its value Dm 77 used for feed back for the drive and reference exciter component 72. Without a center position 4a measurement, the drive mode information is determined by adding same direction motion from sensors 3, 4 and the resultant used for drive mode information.

The mass flow signal M'prop 73 may need to be further corrected for any sensitivity changes in the flow conduit and therefore circuit component 71 receives M'prop signal 73 and modify it as necessary to account for any such sensitivity changes. The methods used for determination and compensation for sensitivity changes are as described for the preferred embodiment where the frequency response of the flow conduit is determined by the use of reference excitations on the flow conduit from component 72. Component 71 working in conjunction with component 72 thereby determines the response to the application of reference excitations and the response value is used to augment the M'prop signal 73 and create therefrom a final M'true output signal 74 that is indicative of true mass flow rate substantially devoid of any errors due to either boundary condition errors or sensitivity related errors.

Alternate means of sensitivity compensation include direct compensation for temperature, pressure, density, viscosity or stress or application of algorithms involving the drive mode frequency raised to a power "n," where "n" is any number or integer, either positive or negative.

Embodiment No. 3

FIG. 9 depicts functional signal processing circuitry that can alternately be used as a simplification of the preferred embodiment. The mechanical portion of the sensor if FIG. 1 may be used without change and the signal processing method of FIG. 9 employed therewith.

The basic idea of taking multiple motion measurements along the active portion of flow conduit 1 is again used and the functionality of separating the Coriolis mode component from the boundary condition mode component is contained within circuit combination components 91, 92 for the inlet and outlet halves of flow conduit 1 respectively. In this embodiment, the shape of the Coriolis mode and boundary condition mode curves, and the relationship to separate the two are all contained within circuit combination components 91, 92. Therefore instead of storing characteristic curves representing the Coriolis mode and the boundary condition mode in a digital version, for solution by a micro processor type solver (component 70 of FIG. 7), this third embodiment applies the functionality of separating these two components from each other in an analog fashion using components 91, 92.

For example, component 91 receives scaled versions of the motions at sensors 2, 3, both containing different proportions of Coriolis mode component or boundary condition mode component. Component 91 then combines these signals mathematically according to the anticipated relationship between the boundary condition mode and the Coriolis mode components. This combination can be whatever is necessary to remove the boundary condition component from the Coriolis mode component, such as a scaled subtraction of the motion at location 2a from the motion at location 3a.

Similarly, for the outlet half of flow conduit 1, scaled versions of the signals from sensors 5, 6 are similarly combined in combination component 92 that then combines these signals mathematically according to the anticipated relationship between the boundary condition mode and the Coriolis mode components. These combined signals 91a, 92a are then conveyed to synchronous demodulator 93 that uses a reference signal from component 95 derived from the signal from sensor 4 at center location 4a. Demodulator 93 then determines the magnitude of combined signals 91a, 92a that, taken together, represent a value proportional to mass flow rate substantially devoid of errors due to boundary condition modes (M'prop 96). Sensitivity compensation component 94 then modifies (if necessary) the M'prop 96 signal for any changes in the sensitivity of the device due to the aforementioned parameters of pressure, density, viscosity, stress and temperature. Component 94 (part of output circuitry for the apparatus) then creates a final output signal M'true 97 substantially devoid of errors both due to boundary condition modes and sensitivity changes. Note that, for purposes of the present invention in its broadest scope, the output signal M'true 97 need not be compensated for errors due to sensitivity, only for errors due to boundary conditions.

The means for sensitivity determination and drive mode and reference excitation have been omitted from the circuit of FIG. 9 for clarity of explanation, however those functionalities are normally present for those purposes as they are in the circuits of FIGS. 6 and 7.

Additional Errors Solved

The primary focus of the present invention as herein described has been to solve for the magnitude of the Coriolis mode component as separate from the errors due to boundary mode components. It is anticipated that other effects on the flow conduit can cause additional errors due to shapes that when superimposed on the Coriolis mode shape causes errors in the measured mass flow signal. The general concept of the present invention can therefore be extended to encompass these additional effects on the flow conduit that can then be additionally separated from the Coriolis mode component.

The general concept for this extension to other effects is similar to that applied to boundary condition modes in that (for highest accuracy) the additional effect is characterized according to its anticipated curve shape, this curve shape (along with its first and second derivatives as required by some curve fitting methods) is used by a curve fitting routine able to find the "best fit" of the actual measured data to the anticipated curve shapes and thereby determine the relative magnitude of each contributing component.

An example of this extension of the present invention includes effects on the flow conduit due to acoustic waves propagating through the fluid that can give rise to characterizable effects on the flow conduit.

Calibration and Modification of Characteristic Curves

The performance of the three embodiments of the present invention herein described can benefit from a calibration procedure of the final configuration of the device. A description of this method is therefore included for the benefit of the designer.

Using the example of the preferred embodiment, the device is constructed according to FIG. 1 and associated with a signal processing circuit as in FIG. 6. Normally, the anticipated characteristic curves of the boundary condition mode BCm and the Coriolis mode Cm stored in component 69 have been determined by FEA methods.

Upon initial startup of the device (under a zero flow situation, and perfectly rigid boundary conditions), the solver 70 will determine the magnitude of Coriolis mode component 73 and Boundary condition mode component 75 as previously described. Since any real device with fall short of perfection from the FEA model, a finite value for both of these components may be calculated. Since there is zero flow in the device, the calculated Coriolis mode component represents an error in the calculation due probably to incorrect characterization of the anticipated function curves. This can be corrected by modifying the curves as necessary to produce a zero output value for the Coriolis mode component 73. Coefficients 5 through 8 of Equation (4), above, can therefore be modified as required for this purpose until a zero value is attained for the Coriolis mode component.

Similarly, by changing the boundary conditions from perfectly rigid to some other boundary conditions, the Coriolis mode component should remain zero valued, and the boundary condition mode component should change appropriately. Again, any deviation from this result indicates that the boundary condition mode is improperly characterized and is therefore in need of modification. Coefficients 1 through 4 of Equation (3) can therefore be modified as required for this purpose until a zero value is attained for the Coriolis mode component with changing boundary condition.

Alternate calibration procedures are anticipated to modify the characteristic equations as necessary to provide for an unchanging M'prop 73 signal with changes in the boundary conditions.

While the described invention can greatly improve the zero stability of a Coriolis mass flow meter under changing boundary conditions, there can be some secondary effects that may detract from the ultimate accuracy that can be achieved. While the effects of pressure, temperature or stress can greatly affect the sensitivity of the device as previously described, they can also have a minor effect on the shape of the characteristic curves of the Coriolis mode and the boundary condition mode due primarily to the "end distortions" of the termination of the flow conduit 1. These end distortions include localized strain and distortion near the end of flow conduit 1 due to, for example, temperature, pressure or stress. The longer flow conduit 1 is in relation to these distortions, the less they will affect the accuracy of the implementation of the present invention. Because these end distortions can slightly modify the anticipated characteristic curves (Equations (3) and (4)), it is anticipated that the coefficients of these Equations (3) and (4) (coefficients 1 through 8) can be modified in situ using compensation values based, for example, on temperature, stress, pressure, density or viscosity.

While this adds complexity to the system, it can therefore improve the ultimate accuracy of the results achieved from the present invention. FIG. 6 therefore includes compensation component 78 that can be used by the present invention to modify the characteristic curve information (coefficients 1 through 8 of Equations (3) and (4)) as a function of fluid or ambient parameters, such as pressure, density, stress, viscosity or temperature.

For example, if it is determined that the calculation of the Coriolis mode component is substantially invariant with changes in the boundary conditions (the goal of the present invention), but that, with an increase of 1000 psi fluid pressure, the Coriolis mode component showed some small finite shift with boundary condition changes, that situation can be resolved by modifying the characteristic curves stored in component 69 as a function of the pressure via component 78. Similarly, the characteristic curves stored in component 69 can be modified as a function of, for example, temperature or stress.

From the above description, it is apparent that the present invention provides an apparatus for measuring a mass flow rate of a fluid flowing relative to a flow conduit, including: (1) a force driver for vibrating the flow conduit, (2) a sensor for measuring a resulting motion of the flow conduit and producing a sensed motion signal indicative thereof, the resulting motion containing a Coriolis mode component and a boundary condition mode component, (3) signal processing circuitry, coupled to the sensor to receive the sensed motion signal therefrom, for determining a magnitude of the Coriolis mode component of the resulting motion and (4) output circuitry for producing an output signal proportional to the mass flow rate, the output signal substantially free of influence from the boundary condition mode component of the sensed motion signal.

Although the present invention and its advantages have been described in detail, those skilled in the art should understand that they can make various changes, substitutions and alterations herein without departing from the spirit and scope of the invention in its broadest form.

What is claimed is:

1. An apparatus for measuring a mass flow rate of a fluid flowing relative to a flow conduit, comprising:

a force driver for vibrating said flow conduit;

a sensor for measuring a resulting motion of said flow conduit and producing a sensed motion signal indicative thereof, said resulting motion containing a Coriolis mode component and a boundary condition mode component;

signal processing circuitry, coupled to said sensor to receive said sensed motion signal therefrom, for determining a magnitude of said Coriolis mode component of said resulting motion; and output circuitry for producing an output signal proportional to said mass flow rate, said output signal substantially free of influence from said boundary condition mode component of said sensed motion signal.

2. The apparatus as recited in claim 1 wherein said flow conduit is selected from the group consisting of:

a conduit within which said fluid flows, a conduit without which said fluid flows, an arbitrary surface over which said fluid flows, and a single straight conduit.

3. The apparatus as recited in claim 1 wherein said force driver vibrates said flow conduit in a mode selected from the group consisting of:

a bending mode of vibration, and a radial mode of vibration.

4. The apparatus as recited in claim 1 wherein said sensor is selected from the group consisting of:

a strain gage, a magnet/coil pair, an accelerometer, and a plurality of motion sensors located along a length of said flow conduit.

5. The apparatus as recited in claim 1 wherein said signal processing circuitry determines said magnitude of said Coriolis mode component by a method selected from the group consisting of:

curve fitting a measured shape of said resulting motion, solving simultaneous equations relating to a measured shape of said resulting motion, employing said resulting motion at a center of said flow conduit as a reference, employing an implied motion at a center of said flow conduit as a reference, employing information describing said Coriolis mode component, employing information describing said boundary condition mode component, employing information describing a drive mode component of said resulting motion, finding a best fit solution for said Coriolis mode component, applying a function of "R" to said Coriolis mode component, and solving for both said Coriolis mode component and said boundary condition mode component.

6. The apparatus as recited in claim 1 further comprising sensitivity compensation circuitry for adjusting said output signal to compensate for a sensitivity of said apparatus to said mass flow rate of said fluid.

7. The apparatus as recited in claim 6 wherein said sensitivity compensation circuitry comprising means for compensating an M'prop signal by a function of one selected from the group consisting of:

temperature, pressure, density, flow conduit stress, viscosity, $W''$, and frequency response.

8. The apparatus as recited in claim 1 wherein said signal processing circuitry manipulates calibratable coefficients.

9. The apparatus as recited in claim 1 wherein said signal processing circuitry contains sensitivity compensation circuitry, said sensitivity compensation circuitry capable of compensating for one selected from the group consisting of:

temperature, pressure, density, flow conduit stress, viscosity, $W^n$, and frequency response.

10. An apparatus for measuring a mass flow rate of a fluid flowing relative to a flow conduit, comprising:

a force driver for vibrating said flow conduit;

a first motion sensor for measuring a resulting motion of said flow conduit at a first location along a length of said flow conduit, said resulting motion having a component proportional to both a Coriolis mode and a boundary condition mode;

a second motion sensor for measuring said resulting motion at a second location along said length of said flow conduit, said resulting motion having a component proportional to said Coriolis mode, a component proportional to said boundary condition mode and a component proportional to both said Coriolis mode and said boundary condition mode;

signal processing circuitry, coupled to said first and second motion sensors to receive sensed motion signals therefrom, for determining a magnitude of said Coriolis mode component of said resulting motion; and output circuitry for producing an output signal proportional to said mass flow rate, said output signal substantially free of influence from said boundary condition mode component of said sensed motion signals.

11. The apparatus as recited in claim 10 wherein said flow conduit is selected from the group consisting of:

a conduit within which said fluid flows, a conduit without which said fluid flows, an arbitrary surface over which said fluid flows, and a single straight conduit.

12. The apparatus as recited in claim 10 wherein said force driver vibrates said flow conduit in a mode selected from the group consisting of:

a bending mode of vibration, and a radial mode of vibration.

13. The apparatus as recited in claim 10 wherein said first and second motion sensors are selected from the group consisting of:

a strain gage, a magnet/coil pair, and an accelerometer.

14. The apparatus as recited in claim 10 wherein said signal processing circuitry determines said magnitude of said Coriolis mode component by a method selected from the group consisting of:

curve fitting a measured shape of said resulting motion, solving simultaneous equations relating to a measured shape of said resulting motion, employing said resulting motion at a center of said flow conduit as a reference, employing an implied motion at a center of said flow conduit as a reference, employing information describing said Coriolis mode component, employing information describing said boundary condition mode component, employing information describing a drive mode component of said resulting motion, finding a best fit solution for said Coriolis mode component, applying a function of "R" to said Coriolis mode component, and solving for both said Coriolis mode component and said boundary condition mode component.

15. The apparatus as recited in claim 10 further comprising sensitivity compensation circuitry for adjusting said output signal to compensate for a sensitivity of said apparatus to said mass flow rate of said fluid.

16. The apparatus as recited in claim 15 wherein said sensitivity compensation circuitry comprising means for compensating an M'prop signal by a function of one selected from the group consisting of:

temperature, pressure, density, flow conduit stress, viscosity, $W^n$, and frequency response.

17. The apparatus as recited in claim 10 wherein said signal processing circuitry manipulates calibratable coefficients.

18. The apparatus as recited in claim 10 wherein said signal processing circuitry contains sensitivity compensation circuitry, said sensitivity compensation circuitry capable of compensating for one selected from the group consisting of:

temperature, pressure, density, flow conduit stress, viscosity, $W^n$, and frequency response.

19. A method of measuring a mass flow rate of a fluid flowing relative to a flow conduit, comprising the steps of:

vibrating said flow conduit with a force driver;

measuring a resulting motion of said flow conduit with a sensor, said sensor producing a sensed motion signal indicative thereof, said resulting motion containing a Coriolis mode component and a boundary condition mode component;

determining a magnitude of said Coriolis mode component of said resulting motion from said sensed motion signal; and producing an output signal proportional to said mass flow rate, said output signal substantially free of influence from said boundary condition mode component of said sensed motion signal.

20. The method as recited in claim 19 wherein said flow conduit is selected from the group consisting of:

a conduit within which said fluid flows, a conduit without which said fluid flows, an arbitrary surface over which said fluid flows, and a single straight conduit.

21. The method as recited in claim 19 wherein said force driver vibrates said flow conduit in a mode selected from the group consisting of:

a bending mode of vibration, and a radial mode of vibration.

22. The method as recited in claim 19 wherein said sensor is selected from the group consisting of:

a strain gage, a magnet/coil pair, an accelerometer, and a plurality of motion sensors located along a length of said flow conduit.

23. The method as recited in claim 19 wherein said step of determining comprises the step of determining said magnitude of said Coriolis mode component by a method selected from the group consisting of:

curve fitting a measured shape of said resulting motion, solving simultaneous equations relating to a measured shape of said resulting motion, employing said resulting motion at a center of said flow conduit as a reference, employing an implied motion at a center of said flow conduit as a reference, employing information describing said Coriolis mode component, employing information describing said boundary condition mode component, employing information describing a drive mode component of said resulting motion, finding a best fit solution for said Coriolis mode component, applying a function of "R" to said Coriolis mode component, and solving for both said Coriolis mode component and said boundary condition mode component.

24. The method as recited in claim 19 further comprising the step of adjusting said output signal to compensate for a sensitivity of said flow conduit to said mass flow rate of said fluid.

25. The method as recited in claim 24 further comprising the step of compensating an M'prop signal by a function of one selected from the group consisting of:

temperature, pressure, density, flow conduit stress, viscosity, $W^n$, and frequency response.

26. The method as recited in claim 19 wherein said step of determining comprises the step of manipulating calibratable coefficients.

27. The method as recited in claim 19 further comprising the step of compensating for one selected from the group consisting of:

temperature, pressure, density, flow conduit stress, viscosity, $W^n$, and frequency response.

28. A method of measuring a mass flow rate of a fluid flowing relative to a flow conduit, comprising the steps of:

vibrating said flow conduit with a force driver;

measuring a resulting motion of said flow conduit at a first location along a length of said flow conduit with a first motion sensor, said resulting motion having a component proportional to both a Coriolis mode and a boundary condition mode;

measuring said resulting motion at a second location along said length of said flow conduit with a second motion sensor, said resulting motion having a component proportional to said Coriolis mode, a component proportional to said boundary condition mode and a component proportional to both said Coriolis mode and said boundary condition mode;

determining a magnitude of said Coriolis mode component of said resulting motion from sensed motion signals received from said first and second motion sensors; and producing an output signal proportional to said mass flow rate, said output signal substantially free of influence from said boundary condition mode component of said sensed motion signals.

29. The method as recited in claim 28 wherein said flow conduit is selected from the group consisting of:

a conduit within which said fluid flows, a conduit without which said fluid flows, an arbitrary surface over which said fluid flows, and a single straight conduit.

30. The method as recited in claim 28 wherein said force driver vibrates said flow conduit in a mode selected from the group consisting of:

a bending mode of vibration, and a radial mode of vibration.

31. The method as recited in claim 28 wherein said first and second motion sensors are selected from the group consisting of:

a strain gage, a magnet/coil pair, and an accelerometer.

32. The method as recited in claim 28 wherein said step of determining comprises the step of determining said magnitude of said Coriolis mode component by a method selected from the group consisting of:

curve fitting a measured shape of said resulting motion, solving simultaneous equations relating to a measured shape of said resulting motion, employing said resulting motion at a center of said flow conduit as a reference, employing an implied motion at a center of said flow conduit as a reference, employing information describing said Coriolis mode component, employing information describing said boundary condition mode component, employing information describing a drive mode component of said resulting motion, finding a best fit solution for said Coriolis mode component, applying a function of "R" to said Coriolis mode component, and solving for both said Coriolis mode component and said boundary condition mode component.

33. The method as recited in claim 28 further comprising the step of adjusting said output signal to compensate for a sensitivity of said apparatus to said mass flow rate of said fluid.

34. The method as recited in claim 33 further comprising the step of compensating an M'prop signal by a function of one selected from the group consisting of:

temperature, pressure, density, flow conduit stress, viscosity, $W^n$, and frequency response.

35. The method as recited in claim 28 wherein said step of determining comprises the step of manipulating calibratable coefficients.

36. The method as recited in claim 28 further comprising the step of compensating for one selected from the group consisting of:

temperature, pressure, density, flow conduit stress, viscosity, $W^n$, and frequency response.

\* \* \* \* \*